United States Patent
Cho et al.

(10) Patent No.: US 9,652,145 B2
(45) Date of Patent: May 16, 2017

(54) METHOD AND APPARATUS FOR PROVIDING USER INTERFACE OF PORTABLE DEVICE

(75) Inventors: Berm-jin Cho, Yongin-si (KR); Yu-shik Whang, Seoul (KR); Hyun-gyoo Yook, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 586 days.

(21) Appl. No.: 12/958,770

(22) Filed: Dec. 2, 2010

(65) Prior Publication Data

US 2011/0131537 A1    Jun. 2, 2011

Related U.S. Application Data

(60) Provisional application No. 61/265,923, filed on Dec. 2, 2009, provisional application No. 61/265,939, filed on Dec. 2, 2009.

(30) Foreign Application Priority Data

Nov. 29, 2010   (KR) .................. 10-2010-0119922

(51) Int. Cl.
```
G06F 3/048      (2013.01)
G06F 3/0488     (2013.01)
G07F 17/32      (2006.01)
```
(52) U.S. Cl.
CPC .......... G06F 3/04883 (2013.01); *G07F 17/32* (2013.01)

(58) Field of Classification Search
CPC .......... G06F 17/30864; G06F 3/04883; G06F 2203/04803

(Continued)

(56) References Cited

U.S. PATENT DOCUMENTS 6,175,789 B1   1/2001   Beckert et al.
7,509,588 B2   3/2009   Van Os et al.
(Continued)

FOREIGN PATENT DOCUMENTS

CN   101002166 A   7/2007
CN   101267330 A   9/2008
(Continued)

OTHER PUBLICATIONS

International Search Report issued Aug. 30, 2011 by the International Searching Authority in counterpart International Patent Application No. PCT/KR2010/008605.

(Continued)

*Primary Examiner* — William Bashore
*Assistant Examiner* — Rayeez Chowdhury
(74) *Attorney, Agent, or Firm* — Sughrue Mion, PLLC

(57) ABSTRACT

A method includes displaying a user interface for displaying a graphic and a hidden graphic in a first area; displaying a set of contents corresponding to the graphic in a second area distinguishable from the first area; detecting a user's gesture for selecting a part of the first area; enlarging the first area to include a part of the second area; displaying a plurality of graphics including the graphic and the hidden graphic in the extended first area in response to the user's gesture; detecting a user's additional gesture for moving a first graphic among the plurality of graphics; and moving the first graphic to a part of the extended first area in response to the user's additional gesture, and moving a second graphic of the plurality of graphics to an area from which the first graphic is moved out.

59 Claims, 12 Drawing Sheets

(58) Field of Classification Search
USPC .......................................................... 715/863
See application file for complete search history.

(56) References Cited

U.S. PATENT DOCUMENTS

| | | | |
|---|---|---|---|
| 2001/0035881 A1* | 11/2001 | Stoakley | G06F 3/04817 715/772 |
| 2003/0043149 A1* | 3/2003 | Safadi | G06F 3/0481 345/428 |
| 2003/0197738 A1 | 10/2003 | Beit-Zuri et al. | |
| 2005/0102631 A1 | 5/2005 | Andreas et al. | |
| 2005/0195390 A1 | 9/2005 | Jeon et al. | |
| 2006/0031784 A1 | 2/2006 | Makela | |
| 2006/0031785 A1 | 2/2006 | Raciborski | |
| 2006/0284852 A1* | 12/2006 | Hofmeister et al. | 345/173 |
| 2006/0288329 A1 | 12/2006 | Gandhi et al. | |
| 2007/0011665 A1 | 1/2007 | Gandhi et al. | |
| 2007/0101297 A1* | 5/2007 | Forstall | G06F 3/04817 715/841 |
| 2007/0157089 A1* | 7/2007 | Van Os | G06F 3/04817 715/702 |
| 2007/0162872 A1 | 7/2007 | Hong et al. | |
| 2007/0266334 A1 | 11/2007 | Donaldson | |
| 2008/0034314 A1* | 2/2008 | Louch | G06F 3/0481 715/778 |
| 2008/0052945 A1* | 3/2008 | Matas | G06F 3/0485 34/173 |
| 2008/0094368 A1* | 4/2008 | Ording et al. | 345/173 |
| 2008/0168401 A1* | 7/2008 | Boule et al. | 715/863 |
| 2008/0187248 A1 | 8/2008 | Ikeda et al. | |
| 2009/0058821 A1 | 3/2009 | Chaudhri et al. | |
| 2009/0115901 A1* | 5/2009 | Winter et al. | 348/565 |
| 2009/0144644 A1* | 6/2009 | Chaudhri | G06F 3/0481 715/764 |
| 2009/0178008 A1* | 7/2009 | Herz | G06F 3/04817 715/840 |
| 2009/0183076 A1* | 7/2009 | Shim | G06F 3/0482 715/716 |
| 2009/0228824 A1 | 9/2009 | Forstall et al. | |
| 2009/0259958 A1 | 10/2009 | Ban | |
| 2010/0100842 A1* | 4/2010 | Kim | 715/808 |
| 2010/0162163 A1* | 6/2010 | Wang | G06F 3/04845 715/800 |
| 2010/0313165 A1* | 12/2010 | Louch | G06F 3/0481 715/792 |
| 2011/0179343 A1* | 7/2011 | Uehori | 715/201 |
| 2011/0246538 A1* | 10/2011 | Boley et al. | 707/805 |

FOREIGN PATENT DOCUMENTS

| | | |
|---|---|---|
| CN | 101390038 A | 3/2009 |
| EP | 1 802 085 A1 | 6/2007 |
| EP | 2 045 700 A1 | 4/2009 |
| JP | 2004062647 A | 2/2004 |
| JP | 2008191895 A | 8/2008 |
| JP | 2009016942 A | 1/2009 |
| JP | 2009-271901 A | 11/2009 |
| JP | 2009266192 A | 11/2009 |

OTHER PUBLICATIONS

Communication dated Jul. 3, 2014 issued by the State Intellectual Property Office of the People's Republic of China in counterpart Chinese Patent Application No. 201080055013.9.
Communication dated Sep. 9, 2014 issued by the Intellectual Property Office of Australia in counterpart Australian Patent Application No. 2010327453.
Communication dated Nov. 11, 2014, issued by the Japanese Intellectual Property Office in counterpart Japanese Application No. 2012-541947.
Communication dated Dec. 29, 2014, issued by the State Intellectualy Property Office of P.R. China in counterpart Chinese Application No. 201080054238.2.
Communication dated Mar. 19, 2015 issued by the State Intellectual Property Office of P.R. China in counterpart Application No. 20080055013.9.
Communication dated Jul. 28, 2015, issued by the Japanese Patent Office in counterpart Japanese Application No. 2012-541948.
Communication dated Sep. 25, 2015 issued by The State Intellectual Property Office of P.R. China in counterpart Chinese Patent Application No. 201080055013.9.
European Search Report for corresponding Application No. 10834789.9 issued Feb. 18, 2016.

* cited by examiner

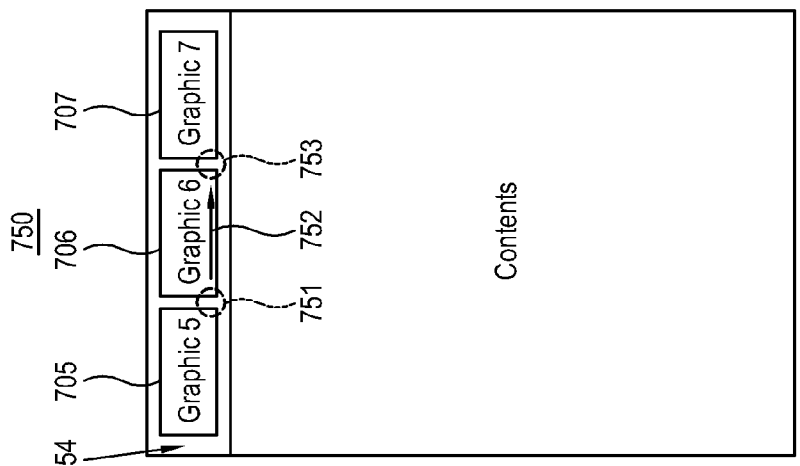
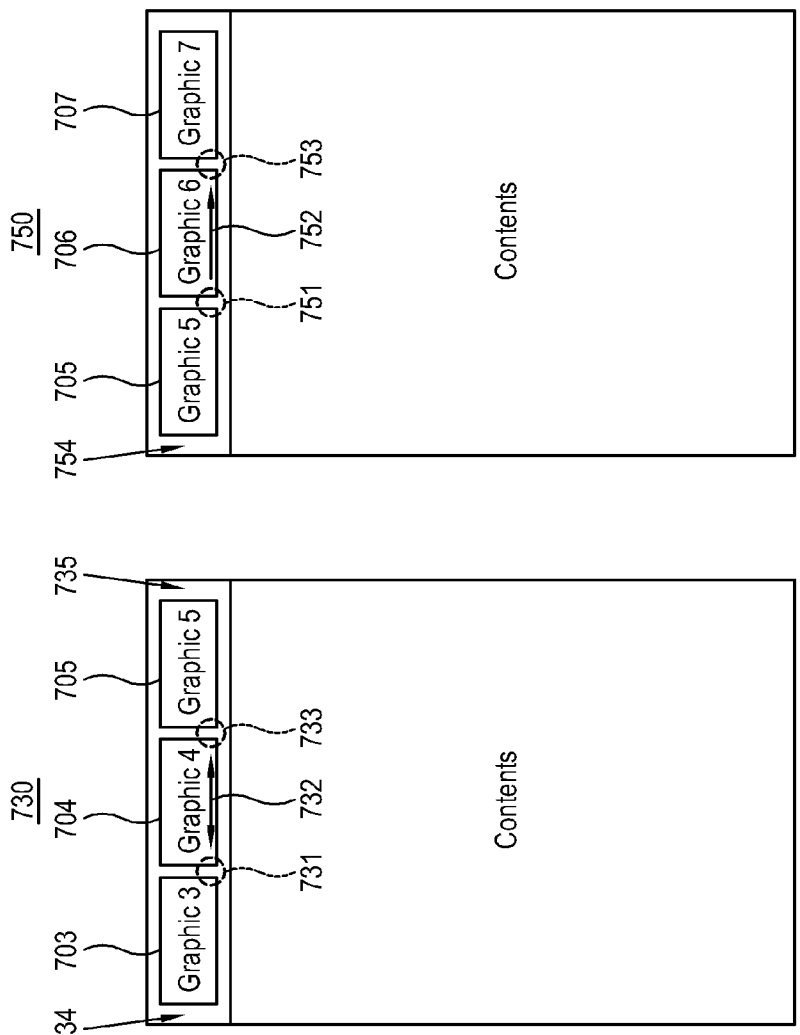
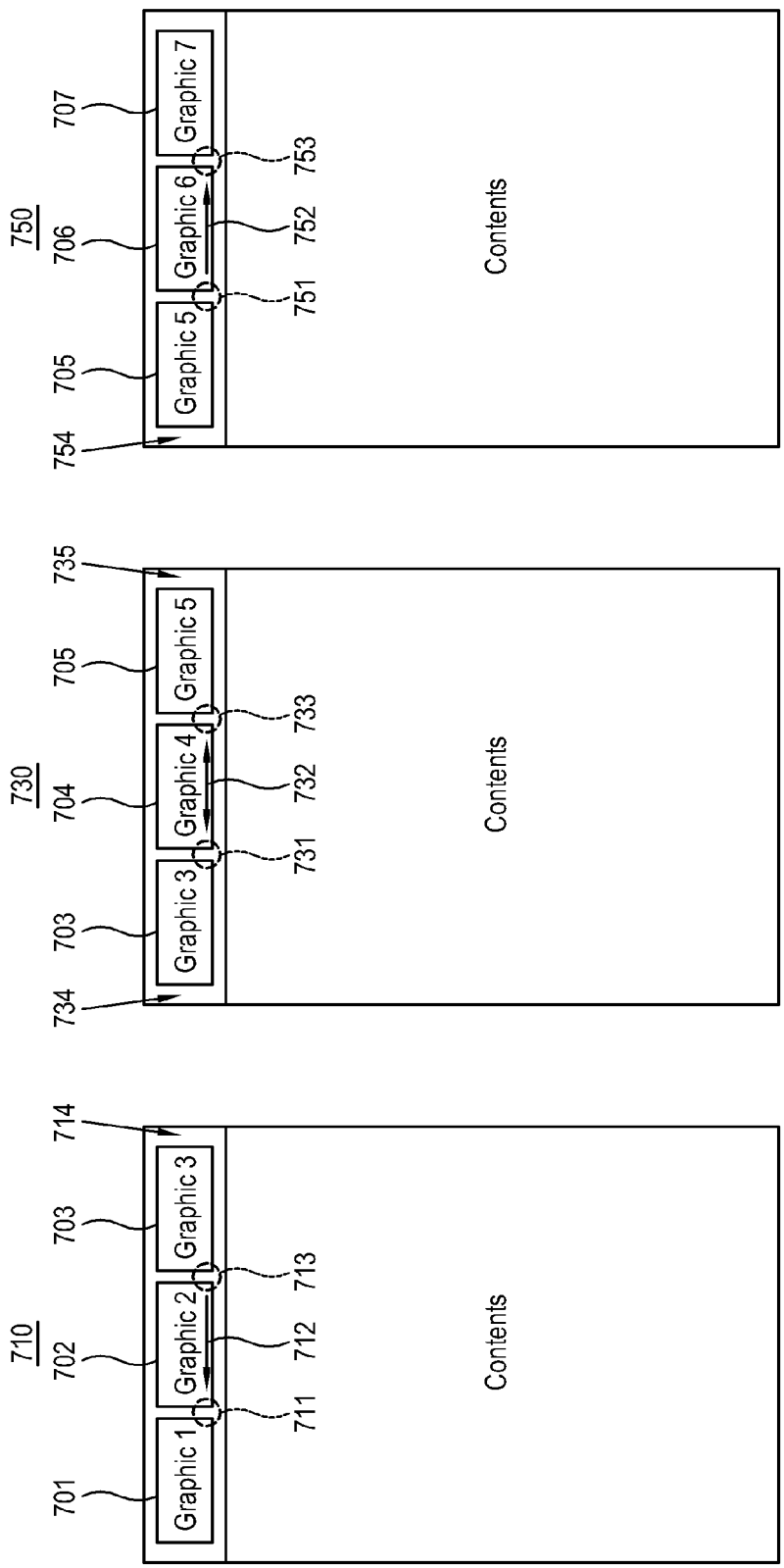
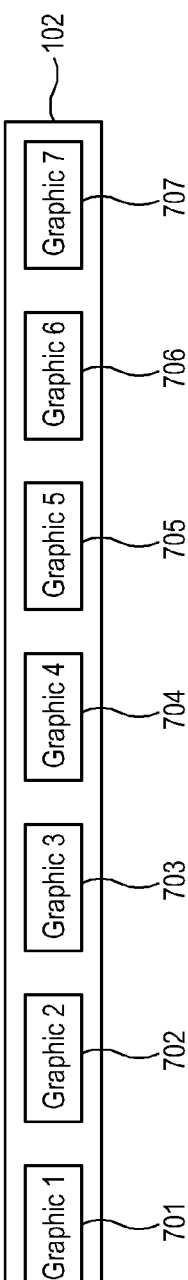

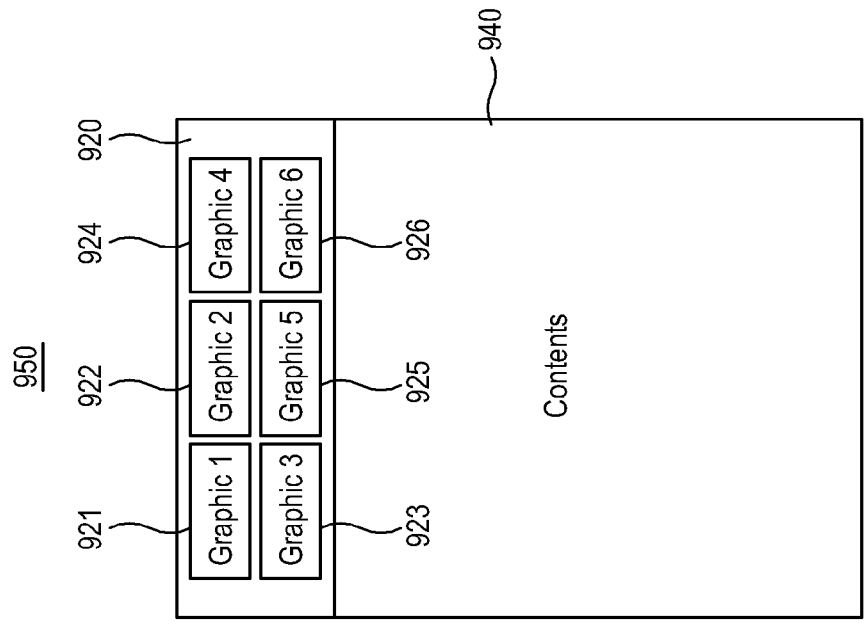
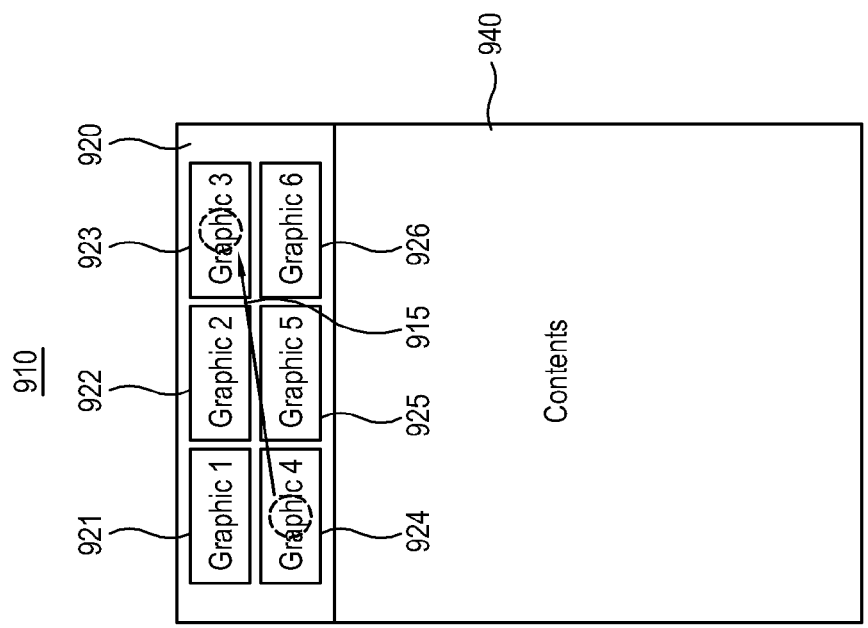

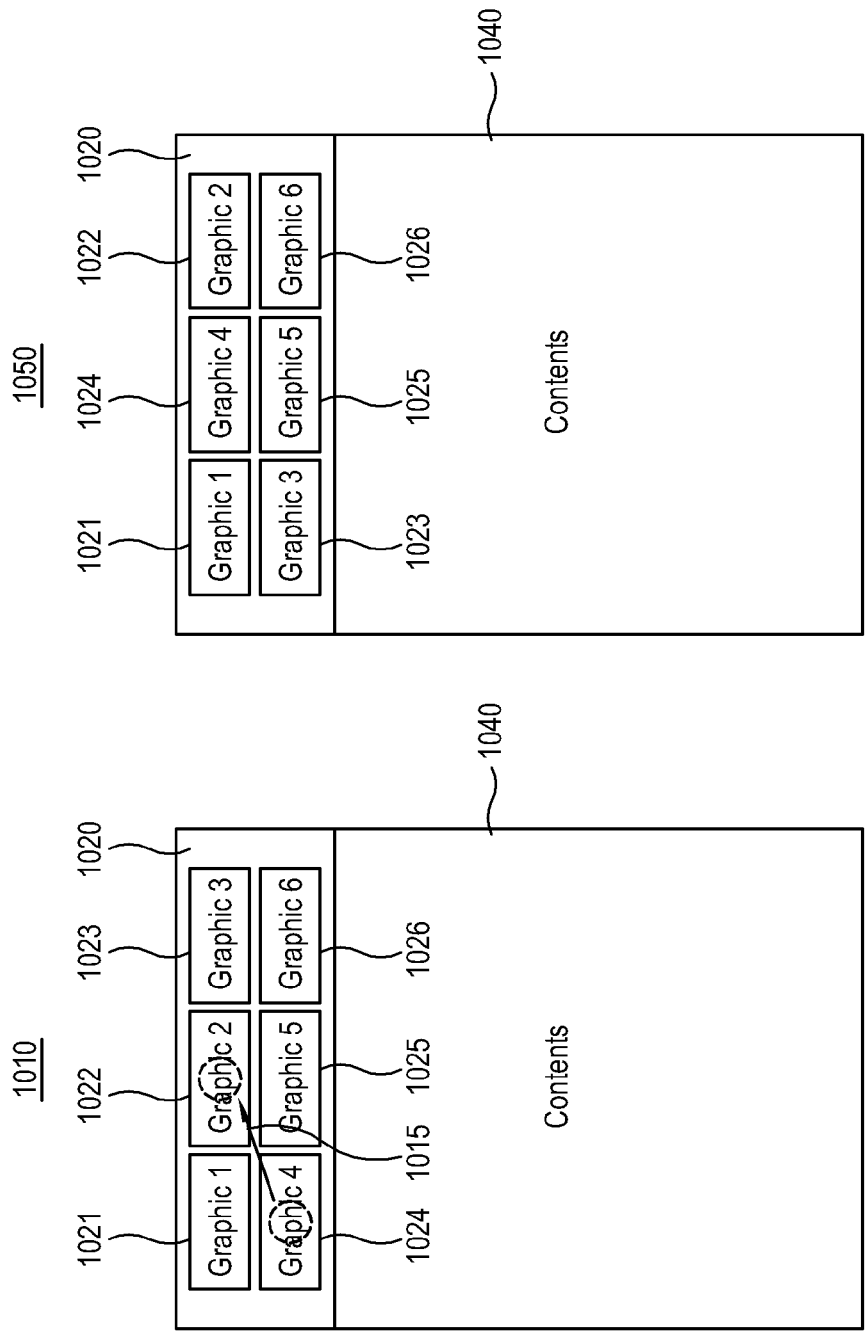

METHOD AND APPARATUS FOR PROVIDING USER INTERFACE OF PORTABLE DEVICE

CROSS-REFERENCE TO RELATED APPLICATIONS

This application claims priority from U.S. Provisional Applications No. 61/265,923 and No. 61/265,939, filed Dec. 2, 2009, and Korean Patent Application No. 10-2010-0119922, filed on Nov. 29, 2010 in the Korean Intellectual Property Office, the disclosures of which are incorporated herein by reference in their entireties.

BACKGROUND

1. Field

Apparatuses and methods consistent with exemplary embodiments relate to a method and an apparatus for providing a user interface, and more particularly, to a method and an apparatus for providing a more efficient user interface by using a screen configuration.

2. Description of the Related Art

A user interface (UI) may provide a temporary or continuous access to enable a communication between a user and an object, a system, a device or a program. The UI may include a physical or virtual medium. Generally, the UI may be divided into an input by which a user manipulates a system and an output by which a response or result of the input to the system is displayed.

Input needs an input device to move a cursor on a screen or to receive a user's manipulation to select a particular object. For example, the input device may include a button, a key, a mouse, a track ball, a touch pad, a joy stick or a touch screen. Output needs an output device to identify a response to the input by using user's sense of sight, hearing or touch. For example, the output device may include a display apparatus, a touch screen, a speaker or an oscillator.

The touch screen may provide both input and output through a screen. Users may touch the screen by using their fingers or a stylus. A computer may recognize the touch on the touch screen, analyze the touch and perform a corresponding operation based on the touch.

SUMMARY

Exemplary embodiments address at least the above problems and/or disadvantages and other disadvantages not described above. Also, an exemplary embodiment is not required to overcome the disadvantages described above, and an exemplary embodiment may not overcome any of the problems described above.

According to an aspect of an exemplary embodiment, there is provided a method for providing a user interface of a portable device, the method including: displaying a user interface for displaying at least one graphic and a hidden graphic in a first area; displaying a set of contents corresponding to one of the at least one graphic in a second area distinguishable from the first area; detecting a user's gesture for selecting a part of the first area; enlarging the first area up to a part of the second area and displaying a plurality of graphics including the at least one graphic and the hidden graphic in the extended first area in response to the user's gesture; detecting a user's additional gesture for moving at least one among the plurality of graphics; and moving at least one among the plurality of graphics to a part of the extended first area in response to the user's additional gesture, and moving at least one of the graphics other than the at least one graphic to an area from which the at least one graphic is moved out.

The displaying the plurality of graphics including the at least one graphic and the hidden graphic in the extended first area may include: displaying at least a part of the hidden graphic in an area converted from the second area to the first area.

The displaying a user interface for displaying at least one graphic and a hidden graphic in the first area may include detecting the user's gesture for selecting the user interface; and displaying the hidden graphic in response to the user's gesture.

The hidden graphic may be positioned in a front direction or a back direction of the at least one graphic, and the detecting the user's gesture for selecting the user interface may include: detecting a contact position and a contact released position of the user on the user interface; determining a direction of the gesture on the basis of the contact position and the contact released position; and displaying the hidden graphic corresponding to the direction of the gesture among the graphics positioned in the front or back direction.

The hidden graphic may be positioned in a front direction or a back direction of the at least one graphic, and the displaying the user interface for displaying the at least one graphic and the hidden graphic in the first area may include: displaying an identifier, which shows a direction where the hidden graphic is positioned, at one side of the first area corresponding to the first or back direction.

The displaying the user interface for displaying the at least one graphic and the hidden graphic in the first area may include: giving a visible feedback to one of the at least one graphic, and the displaying a set of contents corresponding to one of the at least one graphic in the second area includes: displaying the set of contents corresponding to the graphic, to which the visible feedback is given, in the second area.

The displaying a plurality of graphics including the at least one graphic and the hidden graphic in the extended first area may include: removing the visible feedback given to one graphic of the at least one graphic.

The displaying a plurality of graphics including the at least one graphic and the hidden graphic in the extended first area may include: inactivating the set of the at least one content displayed in the second area.

The plurality of graphics may be divided into a first group of graphics and a second group of graphic in accordance with respective positions of the plurality of graphics in the first area, and the displaying a plurality of graphics including the at least one graphic and the hidden graphic in the extended first area may include: detecting a user's gesture for selecting a part of the second area; and downsizing the extended first area into an original area in response to the user's gesture, and displaying the first group of graphics in the downsized first area.

The moving at least one among the plurality of graphics within the extended first area, and moving at least one of the graphics other than the at least one graphic to an area from which the at least one graphic is moved out may include: moving a first graphic among the plurality of graphics to an area for a second graphic among the plurality of graphics; and moving the second graphic to an area from which the first graphic is moved out, if the first graphic is not moved any more for a predetermined period of time.

The graphic may include a tab menu.

According to another aspect of an exemplary embodiment, there is provided a portable device providing a user interface, the portable device including: a touch screen which includes a first area to display a user interface for displaying at least one graphic and a hidden graphic, and a second area to display a set of contents corresponding to one of the at least one graphic, which is distinguishable from the first area; a processor; and a memory, the processor detecting a user's gesture for selecting a part of the first area; enlarging the first area up to a part of the second area and displaying a plurality of graphics including the at least one graphic and the hidden graphic in the extended first area in response to the user's gesture; detecting a user's additional gesture for moving at least one among the plurality of graphics; and moving at least one among the plurality of graphics to a part of the extended first area in response to the user's additional gesture, and moving at least one of the graphics other than the at least one graphic to an area from which the at least one graphic is moved out.

In the case of displaying the plurality of graphics including the at least one graphic and the hidden graphic in the extended first area, the processor may display at least a part of the hidden graphic in an area converted from the second area to the first area.

The processor may detect the user's gesture for selecting the user interface; and display the hidden graphic in the first area in response to the user's gesture.

In the case of displaying a plurality of graphics including the at least one graphic and the hidden graphic in the extended first area, the processor may remove a visible feedback given to one graphic of the at least one graphic.

In the case of displaying a plurality of graphics including the at least one graphic and the hidden graphic in the extended first area, the processor may inactivate the set of the at least one content displayed in the second area.

The plurality of graphics may be divided into a first group of graphics and a second group of graphic in accordance with respective positions of the plurality of graphics in the first area, and in the case of displaying a plurality of graphics including the at least one graphic and the hidden graphic in the extended first area, the processor may detect a user's gesture for selecting a part of the second area; and downsize the extended first area into an original area in response to the user's gesture, and displays the first group of graphics in the downsized first area.

In the case of moving at least one among the plurality of graphics within the extended first area, and moving at least one of the graphics other than the at least one graphic to an area from which the at least one graphic is moved out, the processor may move a first graphic among the plurality of graphics to an area for a second graphic among the plurality of graphics; and move the second graphic to an area from which the first graphic is moved out, if the first graphic is not moved any more for a predetermined period of time.

The graphic may include a tab menu.

According to another aspect of an exemplary embodiment, there is provided a computer-readable medium in which a program is recorded to execute a method for providing a user interface in a portable device, the method including: displaying a user interface for displaying at least one graphic and a hidden graphic in a first area; displaying a set of contents corresponding to one of the at least one graphic in a second area distinguishable from the first area; detecting a user's gesture for selecting a part of the first area; enlarging the first area up to a part of the second area and displaying a plurality of graphics including the at least one graphic and the hidden graphic in the extended first area in response to the user's gesture; detecting a user's additional gesture for moving at least one among the plurality of graphics; and moving at least one among the plurality of graphics to a part of the extended first area in response to the user's additional gesture, and moving at least one of the graphics other than the at least one graphic to an area from which the at least one graphic is moved out.

BRIEF DESCRIPTION OF THE DRAWINGS

The above and/or other aspects will become more apparent from the following description of exemplary embodiments, taken in conjunction with the accompanying drawings, in which:

FIGS. 7A, 7B, 7C, and 7D illustrate a process of providing a hidden graphic according to an exemplary embodiment;

FIGS. 9A and 9B illustrate a process of moving at least one of the plurality of graphics according to an exemplary embodiment;

FIGS. 10A and 10B illustrate a process of moving at least one of the plurality of graphics according to another exemplary embodiment;

DETAILED DESCRIPTION OF EXEMPLARY EMBODIMENTS

Figure 1:
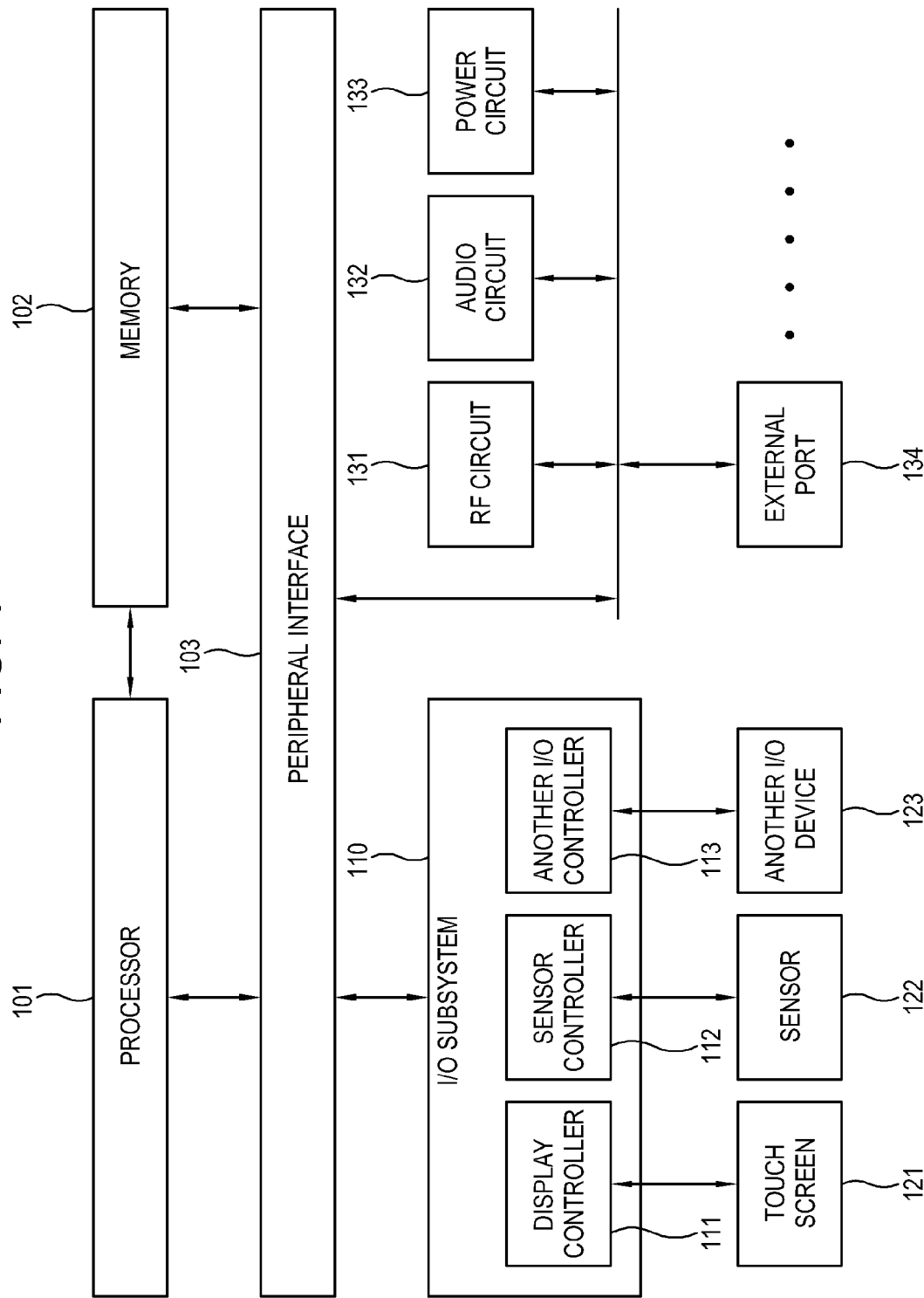
FIG. 1 is a block diagram of a device which includes a touch screen according to an exemplary embodiment.

Certain exemplary embodiments are described in greater detail below with reference to accompanying drawings.

In the following description, like drawing reference numerals are used for like elements, even in different drawings. The matters defined in the description, such as detailed construction and elements, are provided to assist in a comprehensive understanding of exemplary embodiments. However, exemplary embodiments can be practiced without those specifically defined matters.

A computer system is used as a reference to explain exemplary embodiments. The skilled in the art may fully understand that the system and methods as described below are applicable to a voluntary display system including a user interface.

"Exemplary embodiment", "example", "aspect" and "exemplification" used herein shall not be construed that the discretionary aspect or design explained herein are better or more advantageous than other aspects or designs.

"Component", "module", "system" and "interface" used hereinbelow means a computer-related entity in general, and e.g., may mean hardware, a combination of hardware and software, or software.

"Or" means an 'inclusive or' rather than "exclusive or". That is, unless otherwise stated or explicit in the context, the expression "x uses a or b" means one of natural inclusive permutations.

The singular used herein should be interpreted as including "one or more" unless otherwise stated or explicit in the context regarding the singular type.

"And/or" used herein should be understood as referring to and including all of available combinations of at least one item of listed, relevant items.

"Include" and/or "including" means that the concerned property, step, operation, module, elements and/or components exist, but does not exclude that one or more of other properties, steps, operations, modules, elements and component and/or a group thereof exist or are added.

"First", "Second", etc. may be used herein to explain various elements, but the elements are not limited to such terms. The terms are used only to distinguish two or more elements and there is no order or order of priority between the elements.

Hereinafter, an apparatus according to an exemplary embodiment will be described. In an exemplary embodiment, the apparatus, a user interface (UI) for the apparatus and a relevant process for using the apparatus will be described. Such apparatus may include a device which further includes a PDA function, a music playing or calling function and other functions. However, all or part of the apparatus, the user interface and the relevant process according to an exemplary embodiment which will be described below are applicable to digital devices such as a personal computer, a laptop computer, a digital TV, etc.

The apparatus may support at least one of a telephone application, a video conference application, an e-mail application, an instant messaging application, a blogging application, a photo managing application, a digital camera application, a digital video camera application, a web browsing application, a digital music playing application and a digital video playing application.

The various applications above may use, e.g., a physical or virtual UI. For example, a user may change or move information displayed on a touch screen within a single application or to another application through the physical or virtual UI. The apparatus may support various applications by using a physical or virtual UI that is intuitive and clear and uses a common physical or virtual architecture.

FIG. 1 is a block diagram of an apparatus 100 which includes a touch screen 121 according to an exemplary embodiment.

The apparatus 100 may include at least one processor 101, a memory 102, a peripheral interface 103, an input/output (I/O) subsystem 110, a touch screen 121, a sensor 122, another I/O device 123, a radio frequency (RF) circuit 131, an audio circuit 132, a power circuit 133 and an external port 134. Such components may communicate with each other through at least one communication bus or signal line.

FIG. 1 illustrates an example of the apparatus 100, and the apparatus 100 may include more or fewer components, or have a configuration or arrangement integrating two or more components or including different components. The components shown in FIG. 1 may include hardware including an integrated circuit customized for at least one signal processing or application, software or a combination of hardware and software.

The memory 102 may include, e.g., a high-speed random access memory, a magnetic disk, an SRAM, a DRAM, a ROM, a flash memory or a non-volatile memory. The memory 102 may include a software module, an instruction set or other various data. An access to the memory 102 by other components such as the processor 101 and the peripheral interface 103 may be controlled by the processor 101.

The peripheral interface 103 may integrate the input and/or output peripheral device of the apparatus 100 to at least one processor 120 and memory 102. The processor 101 may perform various functions and process data by executing the software module or the instruction set stored in the memory 102.

The RF circuit 131 may transmit and receive an RF signal which is also known as an electromagnetic signal. The RF circuit 131 may convert an electric signal into an electromagnetic signal, convert an electromagnetic signal into an electric signal and communicate with a communication network or other communication devices through an electromagnetic signal. The RF circuit 131 may include a known circuit to perform the foregoing function. The known circuit may include an antenna system, an RF transmitter/receiver, at least one amplifier, a tuner, at least one oscillator, a digital signal processor, a codec chipset, a subscriber identification module (SIM) card, and a memory, but not limited thereto. The RF circuit 131 may communicate in a wireless communication with a cellular phone network, a wireless network such as wireless local area network (LAN) and/or metropolitan area network (MAN), a network such as an intranet and/or the Internet also called the World Wide Web (WWW) and other devices. Such wireless communication may include an e-mail protocol such as Global System for Mobile Communications (GSM), Enhanced Data GSM Environment (EDGE), Wideband Code Division Multiple Access (W-CDMA), Code Division Multiple Access (CDMA), Time Division Multiple Access (TDMA), Bluetooth, Wireless Fidelity (Wi-Fi) for IEEE 802.11a, IEEE 802.11b, IEEE 802.11g and/or IEEE 802.11n, Voice over Internet Protocol (VoIP), Wi-MAX, Long Term Evolution (LIE), Internet Message Access Protocol (IMAP) and/or Post Office Protocol (POP); an instant messaging protocol such as eXtensible Messaging and Presence Protocol (XMPP), Session Initiation Protocol for Instant Messaging and Presence Leveraging Extensions (SIMPLE), Instant Messaging and Presence Service (IMPS) or Short Message Service (SMS) or communication protocols which are not developed at the time of the application date of the present application. In addition to the foregoing wireless communication, other communication standards, protocols and technology may be used.

The audio circuit 132 may provide an audio interface between a user and the apparatus 100 by using a speaker and/or a microphone. The audio circuit 132 may receive audio data from the peripheral interface 103, convert audio data into electric signals and transmit electric signals to the speaker. The speaker may convert the electric signal into a human-audible sound wave. The audio circuit 132 may receive an electric signal converted from a sound wave by a microphone. The audio circuit 132 may convert an electric signal into audio data, and transmit the audio data to the peripheral interface 103 to process the audio data. The audio data may be searched from or transmitted to the memory 102 or the RF circuit 131 by the peripheral interface 103. According to an aspect, the audio circuit 132 may further include a headset jack. The headset jack may provide an interface between a headset including input and output devices or a portable audio I/O peripheral device such as an output headphone.

The power circuit 133 may supply power to all or part of the components of the apparatus 100. For example, the power circuit 133 may include a power management system, at least one power source such as a battery or alternating current (AC) power source, a charging system, a power failure detection circuit, a power transformer or inverter, a power indicator and other voluntary components for generating, managing and distributing power.

The I/O subsystem 110 may integrate an I/O peripheral device such as the touch screen 121, the sensor 122 or the another input control device 123 to the peripheral interface 103. The I/O subsystem 110 may include a display controller 111, a sensor controller 112 or at least one I/O controller 113. According to another aspect, the touch screen 121, the sensor 122 or the input control device 123 may be integrated directly to the peripheral interface 103, instead of through the I/O subsystem 100.

According to another aspect, at least one of the processor 101, the peripheral interface 103 and the I/O subsystem 110 may be provided in a single chip. Otherwise, a part of at least one of the processor 101, the peripheral interface 103 and the I/O subsystem 110 may be provided in a single chip.

The display controller 111 may receive an electric signal from the touch screen 121 including a touch-detection area, transmit an electric signal to the touch screen 121 or transmit and receive an electric signal to/from the touch screen 121. By a control of the display controller 111, the touch screen 121 may display thereon a visual output for a user. The visual output may include a graphic, a text, an icon, a video and a combination of the foregoing elements (collectively, the "graphic"). According to an aspect, a part or all of the visual output may correspond to a user interface which will be described later in more detail.

The touch screen 121 may include a liquid crystal display (LCD), a light emitting polymer display (LPD), an organic light emitting diode (OLED), an active-matrix organic light-emitting diode (AMOLED) or other displays. The touch screen 121 and the display controller 111 may employ capacitive technology, resistive technology, infrared technology and surface acoustic wave technology, but not limited thereto, and may further include other known technologies or touch detection technology which will be developed in the future. The touch screen 121 and the display controller 111 may detect a contact point, its movement or release by using a proximity sensor array or other elements to determine at least one contact address with the touch screen 121.

The display controller 111 may be coupled with a screen which does not include a touch-detection area. The touch-detection area excluding screen may receive an electric signal from the display controller 111 and display a visual output for a user. The touch-detection area excluding screen may include a plasma display panel (PDP), an electronic paper display (EPD), a liquid crystal display (LCD), a light emitting polymer display (LPD), an organic light-emitting diode (OLED), an active-matrix organic light-emitting diode (AMOLED) and other displays. The apparatus 100 which employs the screen excluding the touch-detection area may provide an I/O device such as a keyboard, a mouse or a physical button as a user interface.

The at least one another I/O controller 113 may receive an electric signal from the another I/O device 123 or transmit an electric signal to the another I/O device 123. The another I/O control device 123 may include, e.g., a button, a keyboard, a touch pad, a dial, a slider switch or a joy stick. The another I/O controller 113 may be integrated to any of an infrared port, a USB port and a mouse.

According to an aspect, the another I/O control device 123 may include at least one physical or virtual button. In the case of the virtual button, the button and a button controller may be a part of the touch screen 121 and the display controller 111, respectively. According to an aspect, the button may include an up/down button, a locker button or a push button to adjust a volume of the speaker 111 or the microphone 113. For example, if a user presses the push button briefly, the touch screen 121 is unlocked and an unlocking process may be initiated by applying a gesture to the touch screen. Otherwise, a user may press the push button long to turn on or turn off power to the apparatus 100.

According to another aspect, the another I/O control device 123 may include at least one physical keyboard or virtual soft keyboard. As an example of the keyboard, Qwerty and/or non-Qwerty may be used. In the virtual soft keyboard, the soft keyboard and the soft keyboard controller may be a part of the touch screen 121 and the display controller 111, respectively. The soft keyboard according to an exemplary embodiment may include a fewer number of graphics (or soft keys) than the physical keyboard. Then, a user may select at least one graphic of the soft keyboard, and display at least one corresponding symbol on the touch screen 121.

According to another aspect, the another I/O control device 123 may include a touch pad to enable or disable a particular function. According to another aspect, the touch pad may include a touch-detection area which does not display thereon the visual output unlike the touch screen. The touch pad may include a touch-detection surface separated from the touch screen 121, or a part of the touch-detection surface formed and extended from the touch screen 121.

Figure 2:
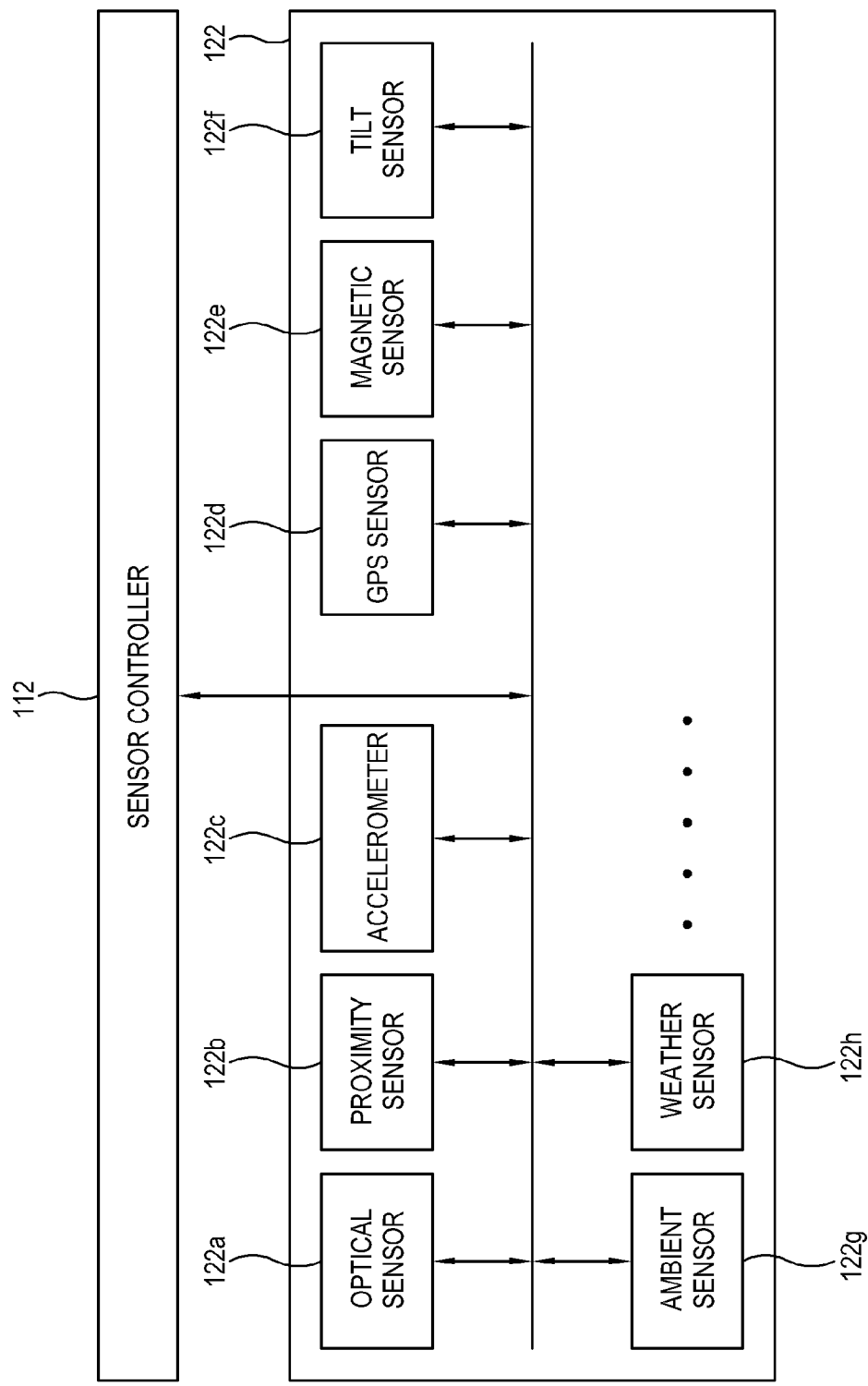
FIG. 2 is a block diagram of a connection between a sensor controller and various types of sensors according to an exemplary embodiment.

FIG. 2 is a block diagram of a connection between the sensor controller 112 and various types of sensors 122 according to an exemplary embodiment.

The sensor controller 112 may receive an electric signal from the sensor 122, transmit an electric signal to the sensor 122 or transmit and receive an electric signal to/from the sensor 122. The sensor 122 may include an optical sensor 122, a proximity sensor 122b, an accelerometer 122c, a GPS sensor 122d, a magnetic sensor 122e, a tilt sensor 122f, an ambient sensor 122g and a weather sensor 122h, but not limited thereto.

According to an aspect, the sensor 122 may include at least one optical sensor 122a. FIG. 2 illustrates the optical sensor 122a which is integrated to the sensor controller 112 of the I/O subsystem 110. The optical sensor 122a may be integrated to the peripheral interface 103. The optical sensor 122a may include a charge coupled device (CCD) or complementary metal oxide semiconductor (CMOS) photo transistor. The optical sensor 122a may receive light emitted through at least one lens from the environment and convert such light into image data. Together with an image module 143, a so-called camera module, the optical sensor 122a may capture a still image or video. According to another aspect, to use the touch screen display as a view finder to acquire at least one of a still image and a video, the optical sensor 122a may be provided in a rear side or a front side of the apparatus 100. According to an aspect, to acquire an image of a user for a video conference while a user views other video conference attendees on the touch screen display, the optical sensor 122a may be provided in the front side of the apparatus 100. According to another aspect, a user may rotate a lens and a sensor of the apparatus housing to change a location of the optical sensor 122a so that the single optical sensor 122a acquires a still image or a video for the video conference. Further, the apparatus 100 may detect the light amount from the optical sensor 122a, adjust a brightness of a particular area of the touch screen 121 by using a value corresponding to the light amount, or adjust a brightness of a graphic on the touch screen 121.

According to an aspect, the sensor 122 may include at least one proximity sensor 122b. FIG. 2 illustrates the proximity sensor 122b which is connected to the sensor controller 112 of the I/O subsystem 110. Otherwise, the proximity sensor 122b may be connected to the peripheral interface 103. The proximity sensor 122b may detect whether any object is proximate to the apparatus 100. For example, the proximity sensor 122b may provide an on or off value with respect to a detection/non-detection of the object. According to an aspect, when the apparatus 100 is proximate to a user's ear like talking over the phone, the proximity sensor 122b may turn off the touch screen 121 to thereby prevent unnecessary battery consumption.

According to another aspect, the sensor 122 may further include at least one of accelerometers 122c. FIG. 2 illustrates the accelerometer 122c which is connected to the sensor controller 112 of the I/O subsystem 110. Otherwise, the accelerometer 122c may be connected to the peripheral interface 103. The accelerometer 122c may detect a change of speed of the apparatus 100 or a direction of the apparatus 100. For example, the accelerometer 122c may measure an accelerating vector value of the apparatus 100 in three axes of X, Y and Z. The accelerometer 122c may provide a displacement value per hour corresponding to the three axes. According to an aspect, information may be displayed on the touch screen 121 vertically or transversely on the basis of the analysis of data transmitted from the at least one accelerometer 122c.

According to another aspect, the sensor 122 may further include at least one GPS sensor 122d. FIG. illustrates the GPS sensor 122d which is connected to the sensor controller 112 of the I/O subsystem 110. Otherwise, the GPS sensor 122d may be connected to the peripheral interface 103. The GPS sensor 122d may receive at least one satellite signal, process the received signal and detect a location of the apparatus 100 on earth. For example, the GPS sensor 122d may provide latitude, longitude and altitude values of the apparatus 100 based on the detected value. For example, the GPS sensor 122d may provide the latitude value of −90 up to +90 degrees and the longitude value of −180 up to +180 degrees. According to an aspect, the location of the apparatus 100 on earth may be displayed on the touch screen 121 on the basis of the analysis of data transmitted from the GPS sensor 122d.

According to another aspect, the sensor 122 may further include at least one magnetic sensor 122e. FIG. 2 illustrates the magnetic sensor 122e which is connected to the sensor controller 112 of the I/O subsystem 110. Otherwise, the magnetic sensor 122e may be connected to the peripheral interface 103. For example, the magnetic sensor 122e may detect an intensity or a change of a magnetic field generated on earth, process the detected signal and determine a direction value of the apparatus 100. For example, the magnetic sensor 122e may provide the intensity and change of the magnetic field as values of three axes of X, Y and Z based on the detected value. According to an aspect, the apparatus 100 may change a rotation of a predetermined icon on the touch screen 121 by using the value provided by the magnetic sensor 122e.

According to another aspect, the sensor 122 may further include at least one tilt sensor 122f. FIG. 2 illustrates the tilt sensor 122f which is connected to the sensor controller 112 of the I/O subsystem 110. Otherwise, the tilt sensor 122f may be connected to the peripheral interface 103. The tilt sensor 122f may include at least one accelerometer and at least one magnetic sensor. The tilt sensor 122f may provide, e.g., azimuth, pitch and roll values by using the values of three axes of X, Y and Z detected from the sensors. For example, the tilt sensor 122f may provide the value ranging from zero to 360 degrees as an azimuth value, the value ranging from −180 to +180 degrees as a pitch value, and the value ranging from −90 to +90 degrees as a roll value. The apparatus 100 according to an aspect may detect a user's gesture gripping and moving the apparatus 100 by using the tilt sensor 122f.

According to another aspect, the sensor 122 may further include at least one ambient sensor 122g. FIG. 2 illustrates the ambient sensor 122g which is connected to the sensor controller 112 of the I/O subsystem 110. Otherwise, the ambient sensor 122g may be connected to the peripheral interface 103. The ambient sensor 122g may detect temperature, humidity and intensity of illumination of the ambient environment of the apparatus 100. The ambient sensor 122g may acquire the detected value per hour. For example, the ambient sensor 122g may provide humidity values ranging from zero to 100%, and temperature in Fahrenheit or Celsius, and the intensity of illumination from level zero to 10. According to an aspect, the apparatus 100 may display on the touch screen 121 the value of the ambient environment of the apparatus 100 acquired through the ambient sensor 122g.

According to another aspect, the sensor 122 may further include at least one weather sensor 122h. FIG. 2 illustrates the weather sensor 122h which is connected to the sensor controller 112 of the I/O subsystem 110. Otherwise, the weather sensor 122h may be connected to the peripheral interface 103. The weather sensor 122h may provide information on humidity, temperature or weather. The weather information relating to a particular day or time may be acquired from an external server. The server may provide weather information based on information of a user's location. According to an aspect, the apparatus 100 may transmit to the server an http request signal including location information. The server may search the weather information on the location based on the location information of the apparatus 100, and provide the apparatus 100 with the searched information as an eXtensible Markup Language (XML) document. For example, the weather sensor 122h may provide the value of humidity ranging from zero to 100%, and the temperature in Fahrenheit or Celsius, and the condition relating to weather as an integer.

Returning back to FIG. 1, the apparatus 100 may perform an operation combining a predetermined function through a screen including a touch-detection area such as the touch screen 121 (or touch pad). In this case, a basic input/control is available on the touch screen 100 for the operation of the apparatus 100, and the number of a physical input/output device such as a push button, keyboard and dial of the apparatus 100 may be reduced.

To perform the operation combining the predetermined function through the touch screen 121, a UI may be displayed on the touch screen 121 for navigation. According to an aspect, if a user touches the touch screen 121, the touch screen 121 may provide a UI such as a main menu or root menu. According to another aspect, the apparatus 100 may provide a physical push button or other physical input and control devices as a UI.

According to an aspect, the apparatus 100 may perform the operation combining the predetermined function through a screen excluding the touch-detection area. The apparatus 100 may use a UI such as a physical keyboard, a mouse and a physical button as a basic input/control device. According to an aspect, if a user manipulates a physical UI, the apparatus 100 may display a visual output on the screen excluding the touch-detection area corresponding to a user's manipulation.

According to another aspect, the apparatus 100 may perform the operation combining the predetermined function through both the touch screen 121 (or touch pad) including the touch-detection area, and the screen excluding the touch-detection area. The apparatus 100 may use at least one of a physical UI and a virtual UI as a basic input/control device. According to an aspect, if a user touches the physical UI or manipulates the virtual UI, the apparatus 100 may interact with the physical or virtual UI and display the result of a user's touch or manipulation on at least one of the touch screen 121 including the touch-detection area and the screen excluding the touch-detection area.

The touch screen 121 may provide a UI between the apparatus 100 and a user. For example, the touch screen 121 may include a touch-detection surface, a sensor or a sensor set which detects a user's input based on a haptic contact or a tactile contact. The touch screen 121 and the display controller 111 may detect a contact, a movement of such contact or a release of contact on the touch screen 121, and convert such detected contact into an interaction with the UI (graphic, at least one soft key, icon, web page or image) displayed on the touch screen 121. According to an aspect, a contact address between the touch screen 121 and a user may correspond to a user's finger, a voluntary object such as a stylus or an appendage. According to an aspect, the UI is designed to operate by a contact mainly based on a user's finger and gesture, which is less accurate than the input by the stylus since the former has a larger contact area on the touch screen 121. In this case, the apparatus 100 may analyze a finger-based rough input as a location or command of an accurate pointer or cursor to perform a desired operation.

The touch screen 121 may display at least one graphic as a UI. According to an aspect, a user may contact (touch) and select at least one graphic by using at least one of his/her fingers. According to another aspect, if a user releases the contact of the at least one graphic, the at least one graphic may be selected. According to an aspect, a user's gesture may include a touch to select a graphic or an area relating to the graphic, a tap which is a gesture touching and releasing the touch to execute a graphic application or receive another graphic, a double tap increasing or decreasing the graphic, a hold maintaining a touch for predetermined time to receive a detailed menu relating to the graphic, a touch and move touching and moving (left to right, right to left or up and down and down and up) or releasing such touch to scroll an item list, a flick or swipe touching, moving and releasing such touch within short time to move to a superior or subordinate list relating to the graphic or to execute other useful functions, and a drag and drop to move the graphic to a desired location. According to an aspect, an accidental contact of the graphic may not select the graphic. For example, if the gesture corresponding to the selection is a tap, a predetermined application may not be selected by a swipe going over the graphic relating to such application. According to another aspect, the apparatus 100 may employ a heuristic method to determine a user's gesture accurately. According to an aspect, cumulative data of a user's gesture, user's characteristics and pattern may be detected and analyzed by the heuristic method, and the apparatus 100 may determine the intent of such user's gesture by using the analyzed data, characteristic and pattern.

According to an aspect, the touch screen 121 may display a virtual soft keyboard as a UI. A user may select at least one graphic (or soft key) of the soft keyboard and display at least one symbol on the touch screen 121. The soft keyboard according to an exemplary embodiment may be adaptive. For example, the displayed graphic may be adjusted by a user's action selecting at least one graphic or at least one symbol. At least one application of the apparatus 100 may employ a common keyboard or different keyboards. Accordingly, the used soft keyboard may be customized for at least a part of the applications or for each user. For example, the at least one soft keyboard according to an exemplary embodiment may be customized for each user on the basis of a word usage record of such user. The soft keyboard may be adjusted to reduce a user's mistake when he/she selects at least one graphic and at least one corresponding symbol.

Hereinafter, an example of a configuration of the memory 102 which is included in the apparatus 100 will be described in more detail with reference to FIG. 3.

Figure 3:
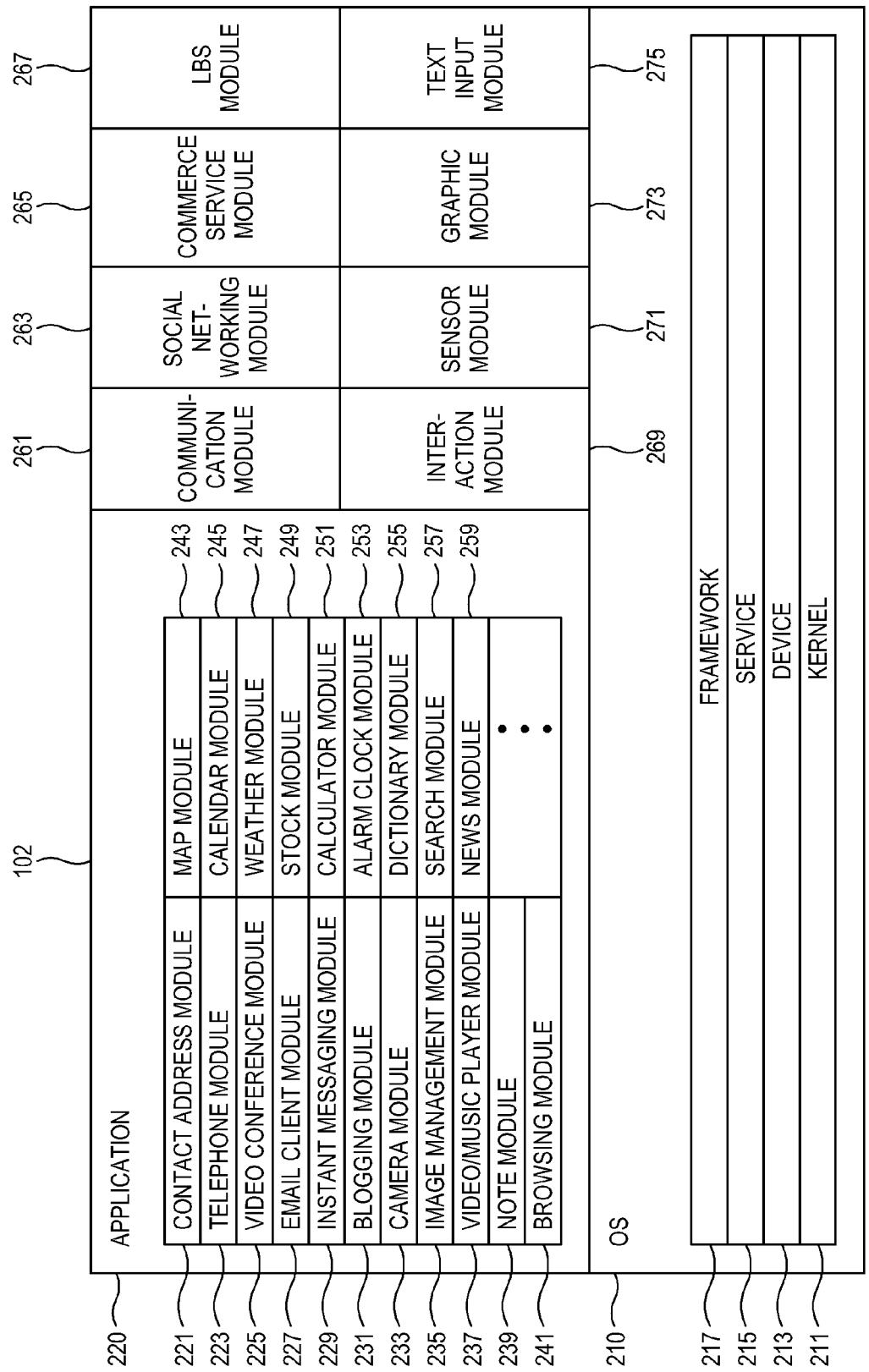
FIG. 3 illustrates an example of a memory of the device according to an exemplary embodiment.

FIG. 3 illustrates an example of the configuration of the memory 102 of the apparatus 100 according to an exemplary embodiment.

According to an aspect, a software component which is stored in the memory 102 may include an operating system (OS) 210, a communication module (or an instruction set) 261, a social networking module (or an instruction set) 263, a commerce service module (or an instruction set) 265, a location based service (LBS) module (or an instruction set) 267, an interaction module (or an instruction set) 269, a sensor module (or an instruction set) 271, a graphic module (or an instruction set) 273, a text input module (or an instruction set) 275 and an application (or an instruction set) 220.

According to an aspect, the communication module 261, the social networking module 263, the commerce service module 265, the LBS module 267, the interaction module 269, the sensor module 271, the graphic module 273 or the text input module 275 may be included in the OS 210. For example, the communication module 261, the social networking module 263, the commerce service module 265, the LBS module 267, the interaction module 269, the sensor module 271, the graphic module 273 or the text input module 275 may provide an interface for the application 220 to access hardware or software components, or control a system task relating to the application 220.

According to another aspect, the communication module 261, the social networking module 263, the commerce service module 265, the LBS module 267, the interaction module 269, the sensor module 271, the graphic module 273 or the text input module 275 may be included in the application 220. For example, the communication module 261, the social networking module 263, the commerce service module 265, the LBS module 267, the interaction module 269, the sensor module 271, the graphic module 273 or the text input module 275 may include a driver of a software component and/or hardware component or perform an operation of the software component and/or hardware component in association with the OS 210.

Like an embedded OS such as Darwin, Linux, Unix, OSX, Windows, bada (one of mobile OSs provided by Samsung Electronics, a Korean company) or VxWorks, the OS 210 includes various software components and/or drivers to control and manage general system tasks including memory management, storage device control and power control, and enables a communication between the various hardware and software components.

The OS 210 according to an exemplary embodiment may include layers of a kernel 211, a device 213, a service 215 and a framework 217.

The kernel 211 may include a real-time OS or a Linux kernel based on the hardware of the apparatus 100.

The device 213 may include platform functions of the apparatus 100 provided by a device OS, a graphic and multimedia function and communication components. For example, the platform functions may include telephony, security, graphics, or events and window management.

The service 215 may include service-oriented functions which are provided by application engines and server-assisted components. By the service 215 which includes contact or messaging engines, the application engines may be provided. For example, the server-assisted functions may be provided by web service components which are connected to service components of the bada server. As above, the applications may manage data stored in remote servers, including geographical information or user presence information through the server-assisted functions. The server-assisted functions may be accessed by an Application Programming Interface (API) of the framework 217.

The framework 217 may include an open API framework of bada. The framework 217 may include an application framework as well as interfaces and classes accessing functions of lower layers. The application framework may provide application life cycle management, event handling or an application control function. The interfaces may be provided by the open API framework. The open API framework may include basic interfaces which are necessary for data handling, utilities, basic functions and application status or application generating a graphic user interface. The API framework may include not only interfaces enabling access to services provided by lower layers, but also user interface, or multimedia, communication, internationalization, location, security, commerce or web browsing interfaces.

The communication module 261 enables a communication with other devices through at least one external port 134, and may include various software components to process data received by the RF circuit 131 and/or the external port 134. The external port 134 such as a universal serial bus (USB) or FireWire may be directly connected to other devices or indirectly connected thereto through a network (such as the Internet or wireless LAN).

The social networking module 263 enables a communication with other devices or a network server through the at least one external port 134, and may include various software components to process data received by the RF circuit 131 and/or the external port 134. The social networking module 263 may share user presence information and the like with other application users or manage user profiles in association with the communication module 261. The social networking module 263 may provide an interface for the application 220 to share user presence information with other application users or manage user profiles. Also, the social networking module 263 or an interface of the social networking module 263 may include a mechanism through which application users gather and use a social networking service on the Internet.

The commerce service module 265 enables a communication with other devices or a network server through at least one external port 134, and may include various software components to process data received from the RF circuit 131 and/or the external port 134. The commerce service module 265 may be in association with the communication module 261. The commerce service module 265 may operate for a user to sell or purchase goods (e.g., game items or applications) through a communication network, or provide an interface which supports such operation to the application 220.

The LBS module 267 enables a communication with other devices or a network server through at least one external port 134, and may include various software components to process data received from the RF circuit 131 and/or the external port 134. The LBS module 267 may be in association with the communication module 261. The LBS module 267 may transmit or receive geographical information (e.g., major landmarks, stores, map data or geographical coding services) through a communication network or process geographical information to be provided to a user or a network server. The LBS module 267 may provide the application 220 with an interface including functions using geographical information.

The interaction module 269 may provide a user with a visual, auditory or tactile feedback as a response to a user's motion or touch (or touch gesture), a response to a detect of a user's shape (face or body) or a response to a preset event.

For example, upon receiving a touch from the touch screen 121, the interaction module 269 may include a software component which provides a user with various vibrations patterns as a haptic function to feedback a tactile response depending on contact by touch, release of contact, size of a contact point, speed, acceleration, direction, change of size or change of direction through the another I/O controller 123 and/or a vibration device (not shown) included in the another I/O device 123. The interaction module 269 may provide an effect as if the screen is shaking, together with the graphic module 273 or the display controller 111 to increase the vibration. Upon receiving a new message from the instant messaging module 229 as a preset event, the interaction module 269 may provide a vibration or a visual feedback, together with the another I/O controller 113, a vibration device (not shown), the graphic module 273 or the display controller 111.

If the interaction module 269, together with the sensor controller 112, the optical sensor 122a included in the sensor 122 and/or the sensor module 271, recognizes a user's shape and determines that the recognized user is a user registered with the apparatus 100, it may provide a feedback including a preset sound/voice or preset visual stimulus in association with the audio circuit 132, the graphic module 273 or the display controller 111. The interaction module 269 may provide an interface to enable the application 220 to use the feedback.

The sensor module 271 may process data acquired from the optical sensor 122a, the proximity sensor 122b, the accelerometer 122c, the GPS sensor 122d, the magnetic sensor 122e, the tilt sensor 122f, the ambient sensor 122g or the weather sensor 122h or provide an interface to enable the application 220 to use the foregoing data.

For example, the sensor module 271 may acquire location information of the apparatus 100 by using data received through the GPS sensor 122d, and provide various applications with the location information. The sensor module 271 may provide the telephone module 223 with the location information acquired through the GPS sensor 122d for a location-based call, or provide the camera module 233 and/or blogging module 231 with the information as metadata such as photo/video. The sensor module 271 may provide the map module 243 or an application providing a location-based service such as navigation and/or the LBS module 267 with the location information acquired through the GPS sensor 122d.

The sensor module 271 may provide the weather module 247 with data acquired from the ambient sensor 122g or the weather sensor 122h. The sensor module 271 may provide the graphic module 273 or the display controller 111 with data acquired from the optical sensor 122a to change a brightness of a graphic or adjust a brightness of a backlight of the screen.

The graphic module 273 includes various known software components to render and display a graphic on the touch screen 121, including a component to change a brightness of the displayed graphic. "Graphic" used herein means any voluntary object which is displayed, including a text, a web page, an icon such as a user-interface object including a soft key, a digital image, a video and animation.

The text input module 275 may be a component of the graphic module 273. The text input module 275 may provide a soft keyboard to various applications (e.g., a contact address module 221, an e-mail client module 227, an instant messaging module 229, the blogging module 231, the browser module 241 or other voluntary applications which need a text input) to input a text, or an interface which activates an input module of a physical keyboard (e.g. Qwerty keyboard).

The application 220 may include the following module (or an instruction set) or a subset or superset thereof: the contact address module 221 (also referred to as address book or contact point); the telephone module 223, the video conference module 225, the e-mail client module 227, the instant messaging (IM) module 229, the blogging module 231, the camera module 233 for still and/or video images, an image management module 235, a video player module, a music player module, or a video/music player module 237 integrating the video player module and the music player module, a note module 239, the browsing module 241, a map module 243, a calendar module 245, the weather module 247, a stock module 249, a calculator module 251, an alarm clock module 253, a dictionary module 255, a search module 257 or a news module.

The memory 102 may include a word processing module, a JAVA module, an encoding module, a digital authority management module, a voice recognition module or a voice replication module as the application 220.

The contact address module 221 may be used to manage an address book or contact address together with the touch screen 121, the display controller 111, the interaction module 269, the graphic module 273 and/or the text input module 275. For example, the contact address module 221 may add names on the address book, delete names from the address book, connect telephone number, e-mail address, physical address or other information with names, connect name and image, classify or sort names, initiate communication by the telephone module 223, the video conference module 225, the e-mail client module 227 or the IM module 227 or provide telephone number or e-mail address to enable the initiation of communication.

The telephone module 223 may operate together with the RF circuit 131, the audio circuit 132, the touch screen 121, the display controller 111, the interaction module 269, the graphic module 273 and/or the text input module 275. For example, the telephone module 223 may input characters corresponding to telephone number, access at least one of telephone numbers of the contact address module 221, revise the input telephone number, dial each telephone number, perform dialog or release connection or hang up if the dialog is over. As described above, wireless communication may employ any of a plurality of communication standards, protocols and technologies.

The video conference module 225 may initiate, perform and end a video conference between a user and at least one conference attendee together with the RF circuit 131, the audio circuit 132, the touch screen 121, the display controller 111, the optical sensor 122a, the sensor controller 112, the interaction module 269, the graphic module 273, the text input module 275, the contact address module 221 and/or the telephone module 223.

The e-mail client module 227 may generate, transmit, receive and manage e-mail together with the RF circuit 131, the touch screen 121, the display controller 111, the interaction module 269, the graphic module 273 and/or the text input module 275. The email client module 227 may generate, transmit and receive e-mail including still or video images acquired through the image management module 235 and/or the camera module 233.

The IM module 229 may operate together with the RF circuit 131, the touch screen 121, the display controller 111, the interaction module 269, the graphic module 273 and/or the text input module 275. For example, the IM module 229 may input characters corresponding to an instant message, revise the input character, transmit and receive each instant message. The transmitted and/or received instant message may include a graphic, a photo, an audio file, a video file and/or other attachment supported by an MMS and/or Enhanced Messaging Service (EMS). "Instant messaging" used herein may refer to both a telephone-based message such as a message transmitted through SMS or MMS and an Internet-based message such as a message transmitted through XMPP, SIMPLE or IMPS.

The blogging module 231 may transmit to or receive from a blog (e.g. a user's blog) a text, a still image, a video, and/or other graphics together with the RF circuit 131, the touch screen 121, the display controller 111, the interaction module 269, the graphic module 273, the text input module 275, the image management module 235, the browsing module 241 and/or the social networking module 263.

The camera module 233 may operate together with the touch screen 121, the display controller 111, the optical sensor 122a, the sensor controller 112, the interaction module 269, the graphic module 273 and/or the image management module 235. For example, the camera module 233 may capture a video including a still image or a video stream to store them in the memory 102, modify the property of the still image or the video or delete such still image or video from the memory 102.

The image management module 235 may operate together with the touch screen 121, the display controller 111, the interaction module 269, the graphic module 273, the text input module 275 and/or the camera module 233. For example, the image management module 235 may arrange, modify, manipulate, label or delete a still image and/or video image or display and store such still image and/or video image as a digital slide show or an album.

The video/music player module 237 may include a video player module. The video player module may display a video on the touch screen 121 or an external display connected through the external port 134, or play such video, together with the touch screen 121, the display controller 111, the interaction module 269, the graphic module 273, the RF circuit 131 and/or the audio circuit 132.

The video/music player module 237 may include a music player module. The music player module may play music stored and recorded in at least one file format including MP3, wma and AAC file and other sound files, together with the touch screen 121, the display controller 111, the interaction module 269, the graphic module 273, the audio circuit 132, the RF circuit 131 and/or the browsing module 241.

The note module 239 may generate and manage a note or a to-do list, together with the touch screen 121, the display controller 111, the interaction module 269, the graphic module 273 and/or the text input module 275.

The browsing module 241 may perform the Internet browsing including searching, linking, receiving and displaying a web page or a part of the web page and an attachment linked to the web page and other files, together with the RF circuit 131, the touch screen 121, the display controller 111, the interaction module 269, the graphic module 273 and/or the text input module 275.

The map module 243 may receive, display, modify or store data on, e.g., driving direction, stores in a particular location or adjacent stores and relevant sites, location-based data and other map-related data and maps, together with the RF circuit 131, the touch screen 121, the display controller 111, the interaction module 269, the graphic module 273, the text input module 275, the sensor module 271, the LBS module 267 and/or the browsing module 241.

The calendar module 245 may generate, display and store a calendar and relevant data (e.g., calendar entry, and a to-do list), together with the RF circuit 131, the touch screen 121, the display controller 111, the interaction module 269, the graphic module 273 and/or the text input module 275.

The weather module 247, the stock module 249, the calculator module 251, the alarm clock module 253 and/or the dictionary module 255 may operate together with the RF circuit 131, the touch screen 121, the display controller 111, the interaction module 269, the graphic module 273, the text input module 275, the communication module 261, the sensor module 271 and/or the browsing module 241. The foregoing modules may be applications which provide weather information, stock information, or calculator, alarm clock or dictionary function.

The search module 257 may search a text, music, sound, image, video and/or other files stored in the memory 102 and matching at least one search condition such as at least one search word designated by a user, together with the touch screen 121, the display controller 111, the interaction module 269, the graphic module 273 and/or the text input module 275.

The news module 259 may operate together with the touch screen 121, the display controller 111, the interaction module 269, the graphic module 273, the RF circuit 131, the communication module 261, the social networking module 263 and/or the text input module 275. For example, the news module 259 may receive a web address designated by a user, a network address, an html, xml, RSS file including news channel/articles or a text about a blog or images or Digital Rights Management (DRM) files and other data in the network or of an external device, or download such data from the network or the external device to the memory 102 and provide a user with such data.

The foregoing modules and applications may correspond to an instruction set to perform at least one of the functions described above. Such modules (i.e., an instruction set) do not need to be realized as an individual software program, procedure or module, and various subsets of such modules may be integrated or rearranged according to various exemplary embodiments. For example, the video/music player module 237 may be a single module or may be classified into a video player module and a music player module. According to some exemplary embodiments, the memory 102 may store therein the foregoing modules and the subset of a data configuration. The memory 102 may further store modules and data configuration which are not described above.

Figure 4:
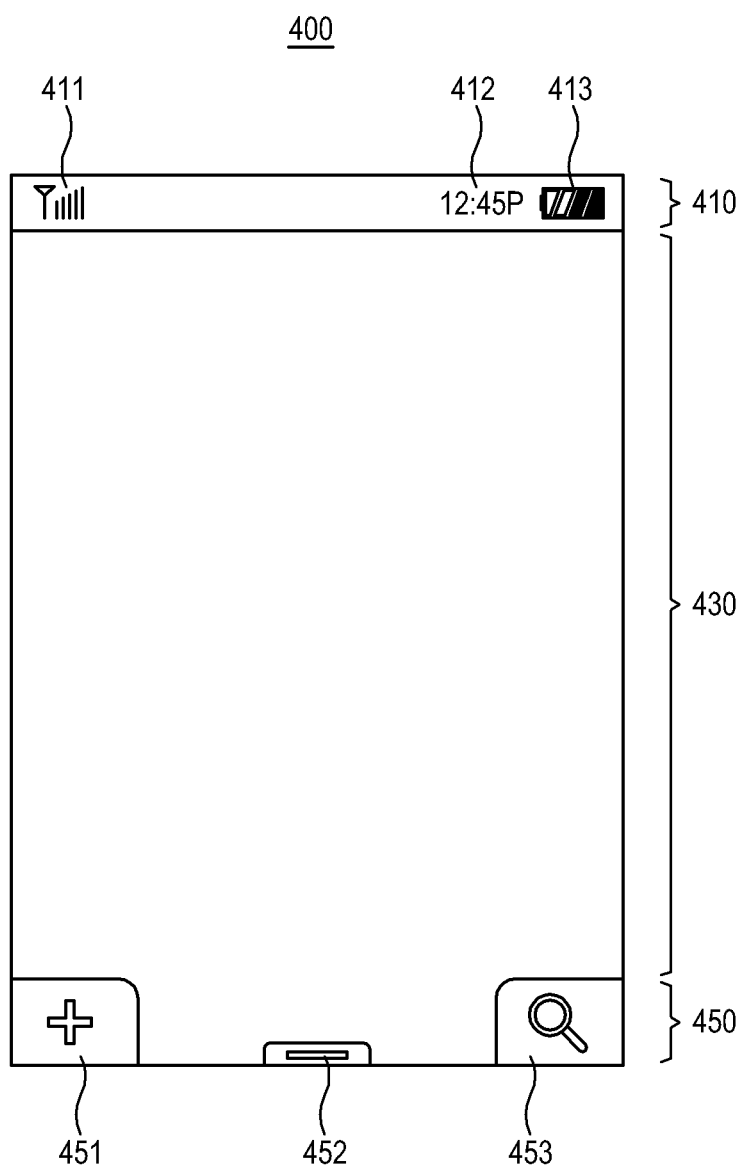
FIG. 4 illustrates an example of a screen configuration of the device which includes the touch screen according to an exemplary embodiment.

FIG. 4 illustrates an example of a screen configuration of the apparatus 100 which includes the touch screen 121 according to an exemplary embodiment.

According to an aspect, an area of the screen 400 may include a status area 410, a main area 430 and a command area 450.

The status area 410 may be provided in an upper part of the touch screen 121 and provide information relating the status of the apparatus 100. For example, the status information may include connection information and system/event information. The connection information may include an icon (or graphic) relating to a signal intensity 411, Wi-Fi connection, Bluetooth connection and call connection. The system/event information may include an icon (or graphic) relating to time 412, a residual amount level of a battery 413, applications on execution (execution of music or radio), reception of message, profile and alarm setting. Such icons may have priority and may be sequentially provided in a left or right side on the status area 410 according to the priority. According to an aspect, an icon which has a lower priority may be hidden while an icon which has a higher priority may be displayed always.

On the main area 430, at least one content which accounts for most of the touch screen 121 and provided by the apparatus 100 may be displayed. In an upper part of the main area 430, information relating to at least one content or a UI relating to at least one content may be provided. For example, the content-related information may include a title of a content, a command name which is executed in a previous screen, a name or location of a category which includes a currently-displayed content. The content-related UI may include a tab or folder to move to another content at the same level as the content. According to an aspect, if at least one content is scrolled on the main area 430, the content-related information or content-related UI provided in an upper side of the main area 430 may hold its location on the main area 430 regardless of a scroll gesture.

The command area 450 may be provided in a lower part of the touch screen 121, and provide, e.g., a UI such as at least one of soft keys 451 and 453 and an option menu 452. According to an aspect, the command area 450 may be used as a part of the main area 430 usually, and provide the soft keys 451 and 453 or the option menu 452 depending on circumstances (e.g. when a user contacts, moves or releases such contact). The soft keys 451 and 453 may be provided to perform useful functions relating to an application on execution. For example, the soft keys 451 and 453 may include a search function, a function returning to a previous screen, a function canceling an operation being executed and a function adding a new category. The soft keys 451 and 453 may be provided in a left side or right side of the command area 450 and include at least one key in proportion to the number of available functions. The soft keys 451 and 453 may include various graphics, e.g. icons and texts which are intuitive and easy to understand. The option menu 452 may provide an option with respect to a content displayed on the main area 450 or to an application being executed. For example, if a user selects the option menu 452, the option menu 452 may provide a soft keyboard having at least one symbol displayed on the main area 430 or at least one available function or detailed information of contents on the main area 430.

The apparatus 100 may include at least one physical UI together with the virtual UI. According to an aspect, the apparatus 100 may include a power/lock button, a home button, a volume up button and a volume down button. The power/lock button may lock or unlock the apparatus or turn on or off the apparatus 100 when pressed long. The home button may be navigated by a voluntary application of an application set executable in the apparatus 100 (e.g., main page application). The volume up button and the volume down button may increase and decrease volume, respectively. According to another exemplary embodiment, the apparatus 100 may further include a send button, a camera button and an end button. The send button may display a telephone log or connect the latest received telephone call when pressed long. The camera button may photograph by executing a camera application or using the optical sensor 122a of the apparatus 100. The end button may end a currently executed application and return to the main page, or end a call connection when a user is on the phone. A set of functions corresponding to the foregoing button may be performed by using the same physical button, or functions corresponding to a single button may be distributed and performed by different physical buttons. The function of the physical button may be realized as a virtual button on the touch screen 121. According to another exemplary embodiment, the apparatus 100 may receive a verbal input through the audio circuit 132 as a physical UI to enable or disable some functions.

Hereinafter, exemplary embodiments of a user interface and its related process to be implemented on the apparatus 100 will be described.

Figure 5:
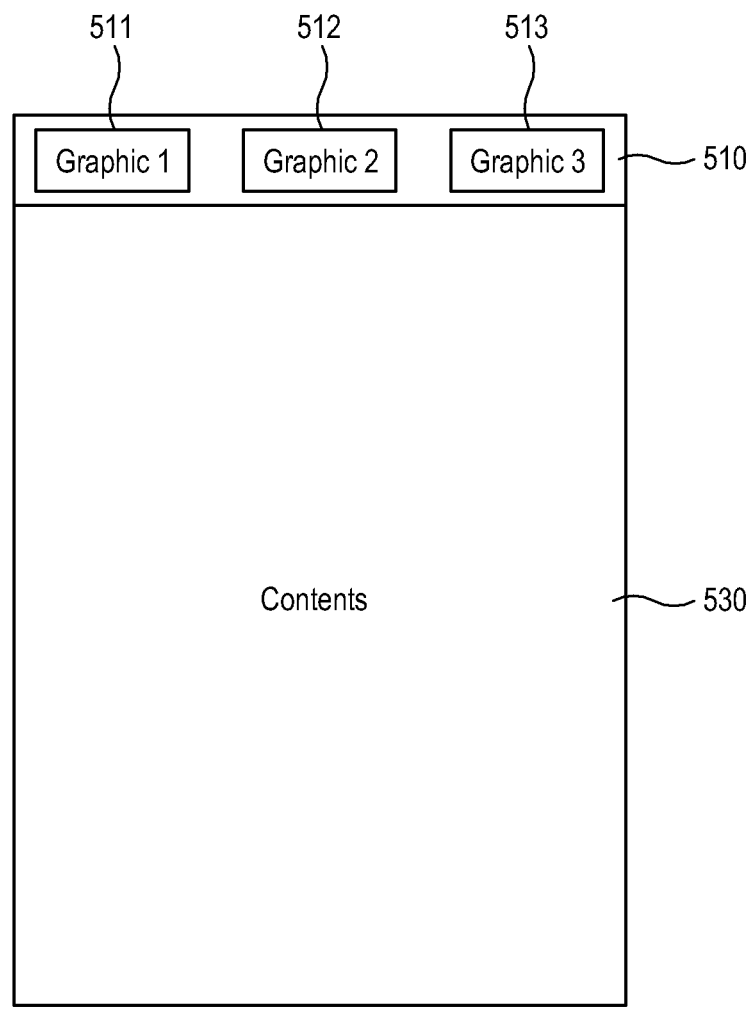
FIG. 5 illustrates a user interface of an apparatus according to an exemplary embodiment.

FIG. 5 illustrates a user interface of an apparatus 100 according to an exemplary embodiment.

The user interface of FIG. 5 may be included in the main area 430 of FIG. 4. FIG. 5 may include a first area 510 and a second area 530. The first area 510 may provide information related to at least one of contents, or a user interface related to at least one of contents. For example, if a plurality of graphics 511 to 513 are provided in the first area 510 and a user selects one among the plurality of graphics 511 to 513, a set of contents corresponding to the selected graphic may be displayed on the second area 530. At this time, the graphic may be a tab menu.

When the set of contents corresponding to one graphic among the plurality of graphics 511 to 513 is displayed on the second area 530, the one graphic may be provided with a visible feedback. For example, the whole or a part of the graphic may be changed in color, the circumference of the graphic may be highlighted, or the position of the graphic may be moved.

Figure 6A:
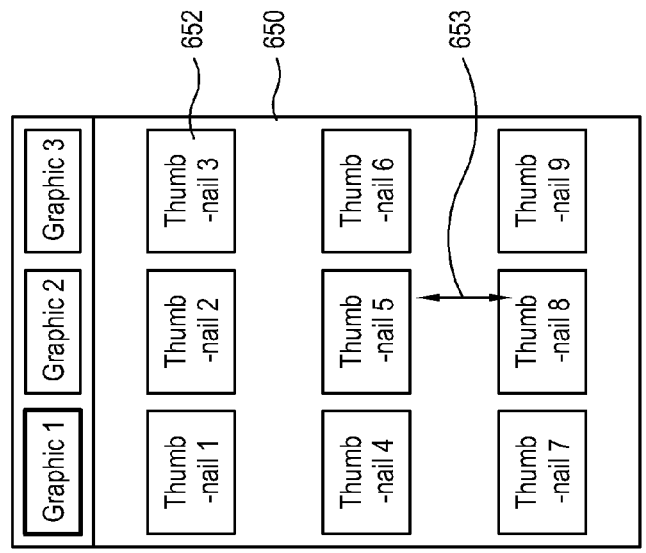
FIGS. 6A, 6B, and 6C illustrate an example of an operation of a user interface according to an exemplary embodiment.
Figure 6B:
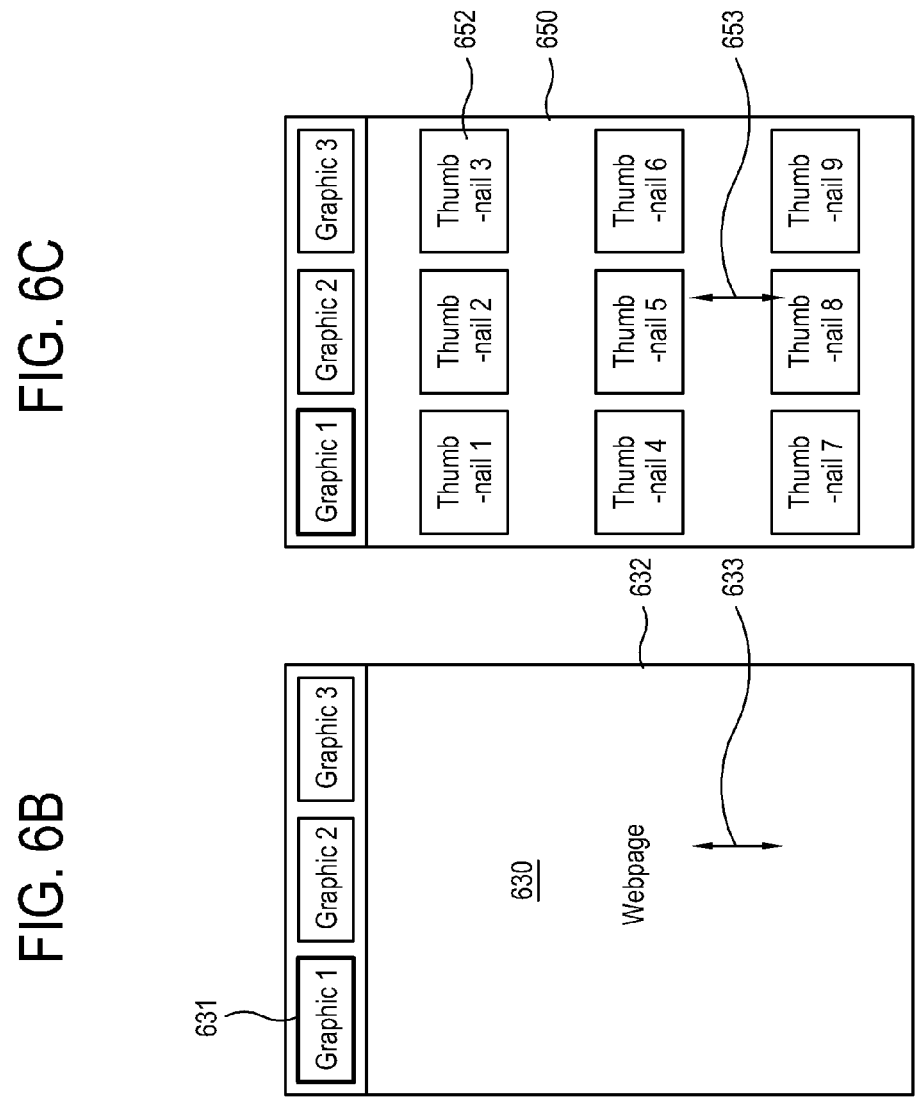
Figure 6C:
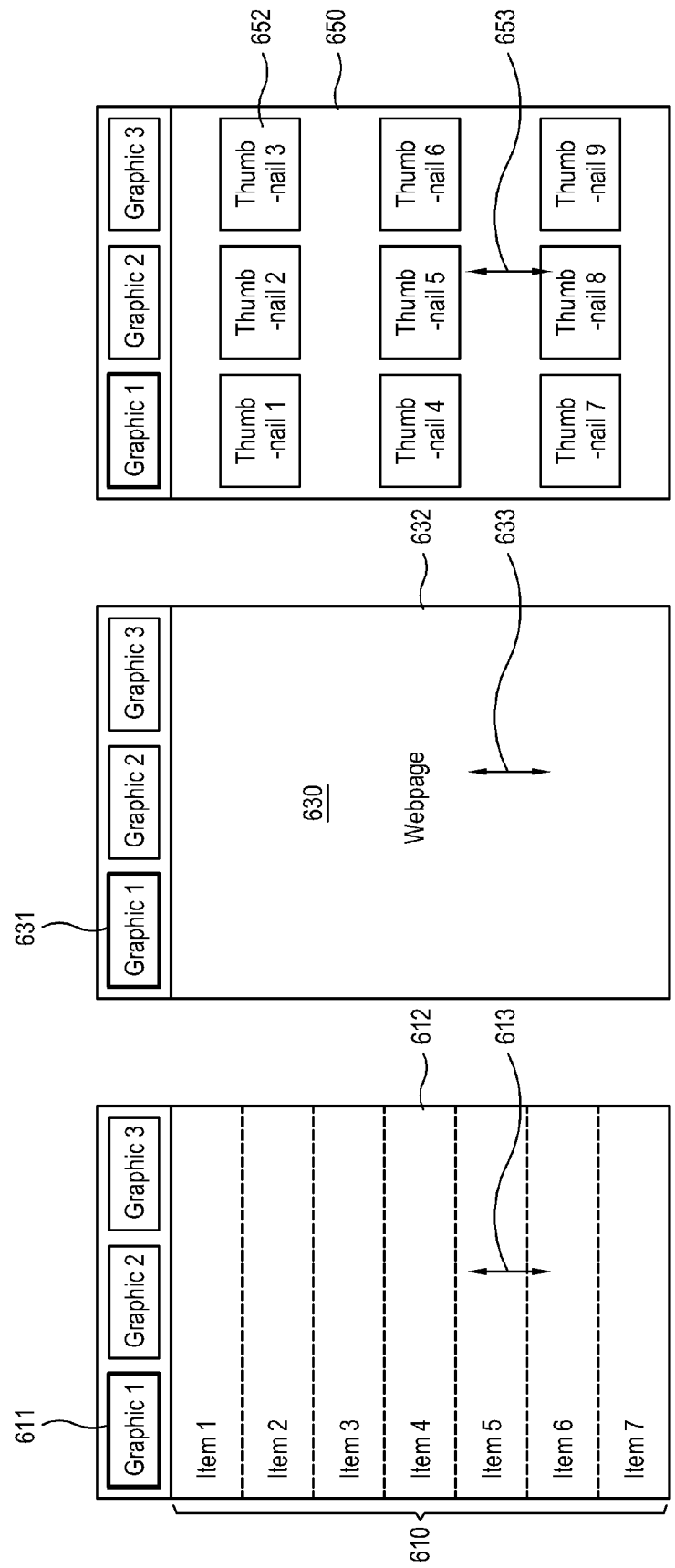

FIGS. 6A, 6B, and 6C illustrate an example of an operation of a user interface according to an exemplary embodiment.

According to an exemplary embodiment, a reference numeral 610 of FIG. 6A represents a plurality of items 612 as a set of contents corresponding to a graphic 611. Here, the plurality items 612 may be provided by executing the contact address module 221, the telephone module 223, etc.

According to another exemplary embodiment, a reference numeral 630 of FIG. 6B represents a web page 632 as a set of contents corresponding to a graphic 631. Here, the web page 632 may be provided by executing the browsing module 241, etc.

According to still another exemplary embodiment, a reference numeral 650 of FIG. 6C represents a plurality of thumbnails 652 as a set of contents corresponding to a graphic 651. For example, the plurality of thumbnails 652 may be providing by executing the camera module 233, the image management module 235, or etc. The plurality of items 612, the web page 632 or the thumbnails 652 as described above may be moved in a direction corresponding to a predetermined direction (e.g., a up or down direction) in which a user's gesture 613, 633, 653 moves.

FIGS. 7A, 7B, 7C, and 7D illustrate a process of providing a hidden graphic according to an exemplary embodiment.

Reference numerals 710, 730 and 750 of FIGS. 7A, 7B, and 7C illustrate user interface screens for displaying at least one graphic and a hidden graphic on the first area 510 according to an exemplary embodiment. For example, the user interface for displaying the hidden graphic may be the whole or a part of the first area 510. The apparatus 100 can detect a user's gesture for selecting the user interface, and display the whole or a part of the hidden graphic in response to the user's gesture.

The at least one graphic and the hidden graphic may follow a predetermined order. A reference numeral 770 of FIG. 7D shows an order in which the at least one graphic and the hidden graphic are positioned. For example, the order of the at least one graphic and the hidden graphic may be achieved in the form of a stack, a queue, a linked list, etc., and stored in the memory 102 of the apparatus 100.

Each of the first areas in the screens 710, 730 and 750 of FIGS. 7A, 7B, and 7C may include an identifier for showing a direction where the hidden graphic is positioned.

According to an exemplary embodiment, an identifier 714 showing that the hidden graphics 704, 705, 706, and 707 will be displayed from the back of the at least one graphic 701, 702, and 703 may be provided at one side of the first area in the screen 710 of FIG. 7A. According to another exemplary embodiment, identifiers 734 and 735 showing that the hidden graphics 701 and 702, 706 and 707, respectively, will be displayed from at least one of the front or the back of the at least one graphic 703, 704, and 705 may be provided at one side of the first area in the screen 730 of FIG. 7B. According to still another exemplary embodiment, an identifier 754 showing that the hidden graphics 701 to 704 will be displayed from the front of the at least one graphic 705 to 707 may be provided at one side of the first area in the screen 750 of FIG. 7C. The identifiers 714, 734, 735 and 754 may have various shapes such as a triangle, a star, a heart, a finger, an arrow, etc., but not limited thereto. Also, if a user selects the identifier, the identifiers may be provided with various visible feedbacks. For example, the identifiers may be changed in shape or color, or be highlighted.

The first area in the screens 710, 730 and 750 of FIGS. 7A, 7B, and 7C may include a user interface for displaying the hidden graphics. The apparatus 100 detects a user's contact position and a contact released position on the user interface, and determines a direction of the gesture on the basis of the contact position and the contact released position. Further, the apparatus 100 can display the hidden graphic corresponding to the direction of the gesture in accordance with the determination.

According to an aspect, if a user contacts a part of the first area (reference numeral 711), moves the contact frontward keeping the contact (reference numeral 712), and releases the contact (reference numeral 713) in the screen 710 of FIG. 7A, the hidden graphics 704 to 707 may be displayed from the back. According to another aspect, if a user contacts parts of the first area (reference numerals 731, 733), moves the contacts backward or frontward keeping the contacts (reference numeral 732), and releases the contacts (reference numerals 733, 731) in the screen 730 of FIG. 7B, the hidden graphics 701 and 702, 706 and 707 may be displayed from the front or the back, respectively. According to still another aspect, if a user contacts a part of the first area (reference numeral 751), moves the contact backward keeping the contact (reference numeral 752), and releases the contact (reference numeral 753), in the screen 750 of FIG. 7C, the hidden graphics 701 to 704 may be displayed from the front. The user's gesture for displaying the hidden graphic from the front or the back may include flick, touch and move, swipe, drag and drop, etc., but not limited thereto.

Figure 8A:
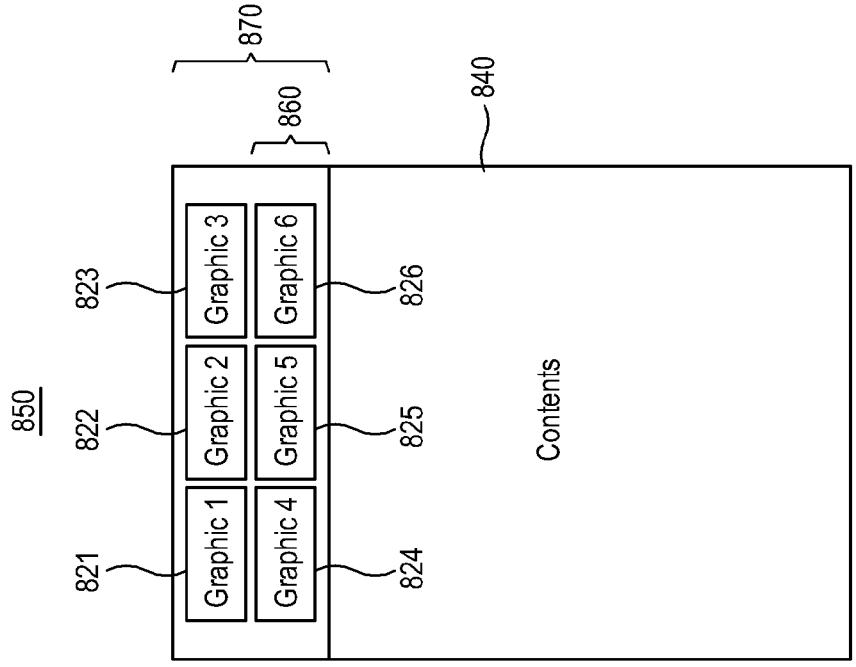
FIGS. 8A and 8B illustrate a process of providing at least one of graphics and a hidden graphic according to an exemplary embodiment.
Figure 8B:
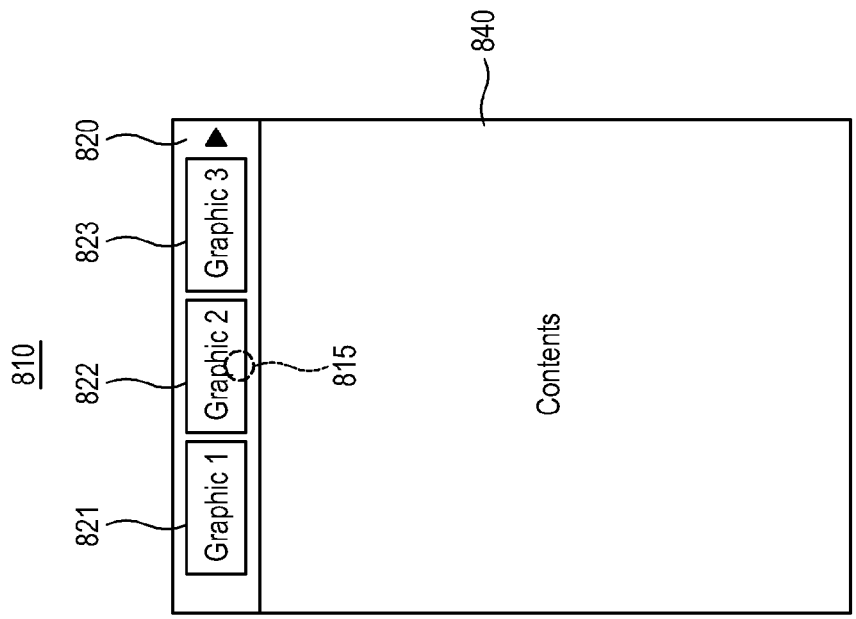

FIGS. 8A and 8B illustrate a process of providing at least one of graphics and a hidden graphic according to an exemplary embodiment.

In the screen 810 of FIG. 8A, the apparatus 100 can detect a user's gesture 815 for selecting a part of a first area 820. For example, a user's gesture may include touch and hold for selecting a part of the first area 820.

In the screen 850 of FIG. 8B, the apparatus 100 may extend the first area 820 to a part 860 of a second area 840 in response to a user's gesture 815, and display a plurality of graphics including at least one graphic 821, 822, and 823 and hidden graphics 824, 825, and 826 on the extended first area 870. In this case, the whole or a part of the hidden graphics 824 to 826 may be displayed on an area 860 converted from the second area to the first area. At this time, the hidden graphics 824 to 826 may be displayed from the bottom of the at least one graphic 821 to 823.

When the apparatus 100 detects the user's gesture 815 for selecting a part of the first area 820, a set of contents displayed within the second area 840 may be inactivated. For example, The apparatus 100 may not provide an operation or a visible feedback related to the at least one content in the state that a user selects at least one among the sets of contents in the second area 840. Also, at this time, the sets of contents in the second area 840 may move downward, or some sets of contents may be covered with the extended first area 860. Further, the visible feedback provided to at least one graphic within the first area 820 may be removed. For example, if the visible feedback changes the color of the at least one graphic from first color to second color, the color of the graphic may be returned to the first color.

FIGS. 9A and 9B illustrate a process of moving at least one of the plurality of graphics according to an exemplary embodiment.

In the screen 910 of FIG. 9A, the apparatus 100 selects at least one graphic 924 among a plurality of graphics 921, 922, 923, 924, 925, and 926 within an extended first area 920 where the plurality of graphics 921 to 926 is displayed, and detects a user's additional gesture 915 for moving the selected graphic 924. In response to the user's additional gesture 915, the apparatus 100 may move at least one graphic 923 among the plurality of graphics 921 to 926 to an area of the extended first area 920. For example, the apparatus 100 may move a first graphic 924 among the plurality of graphics 921 to 926 to an area for a second graphic 923 among the plurality of graphics 921 to 926. At this time, the second graphic 923 may be one of the displayed graphics on the screen 810 of FIG. 8A, and the first graphic 924 may be one of the hidden graphics in the screen 810 of FIG. 8A.

In the screen 950 of FIG. 9B, if the at least one graphic 924 among the plurality of graphics 921 to 926 is moved to an area of the first area 920 in response to the user's additional gesture 915, the apparatus 100 may move at least one 923 among the graphics other than the at least one graphic 924 to an area from which the at least one graphic 924 is moved out. For example, if the first graphic 924 among the plurality of graphics 921 to 926 is moved to an area of the first area 920 and does not move for a predetermined period of time, the apparatus 100 may move the second graphic 923 to an area from which the first graphic 924 is moved out. At this time, the case where the first graphic 924 is not moved any longer may include that a user moves the first graphic 924 while keeping the contact and keeps or releases the contact on one position for a certain period of time.

FIGS. 10A and 10B illustrate a process of moving at least one of the plurality of graphics according to another exemplary embodiment.

In the screen 1010 of FIG. 10A, the apparatus 100 may detect a user's additional gesture 1015 for selecting at least one graphic 1024 among the plurality of graphics 1021, 1022, 1023, 1024, 1025, and 1026 within the extended first area 1020 and moving the selected graphic 1024.

In the screen 1050 of FIG. 10B, the apparatus 100 may move at least one graphic 1024 among the plurality of graphics to an area of the first area 1020 in response to a user's additional gesture 1015, and move a graphic 1023 adjacent to the at lest one graphic 1024 to an area from which the at least one graphic 1024 is moved out. Again, another adjacent graphic 1022 is pushed in and moved to an area from which the adjacent graphic 1023 is moved out. For example, when the first graphic 1024 among the plurality of graphic 1021 to 1026 is moved to an area of the first area 1020, the apparatus 100 moves an adjacent third graphic 1023 to an area from which the first graphic 1024 is moved out, and moves an adjacent second graphic 1022 again to an area from which the third graphic 1023 is moved out.

Figure 11B:
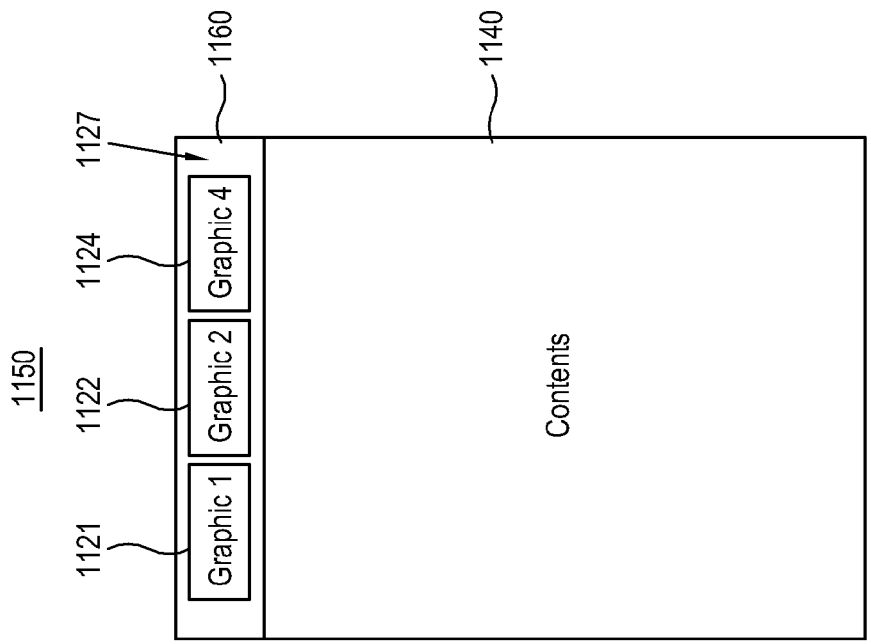
FIGS. 11A and 11B illustrate a process of providing a first group of graphics among the plurality of graphics according to an exemplary embodiment.
Figure 11A:
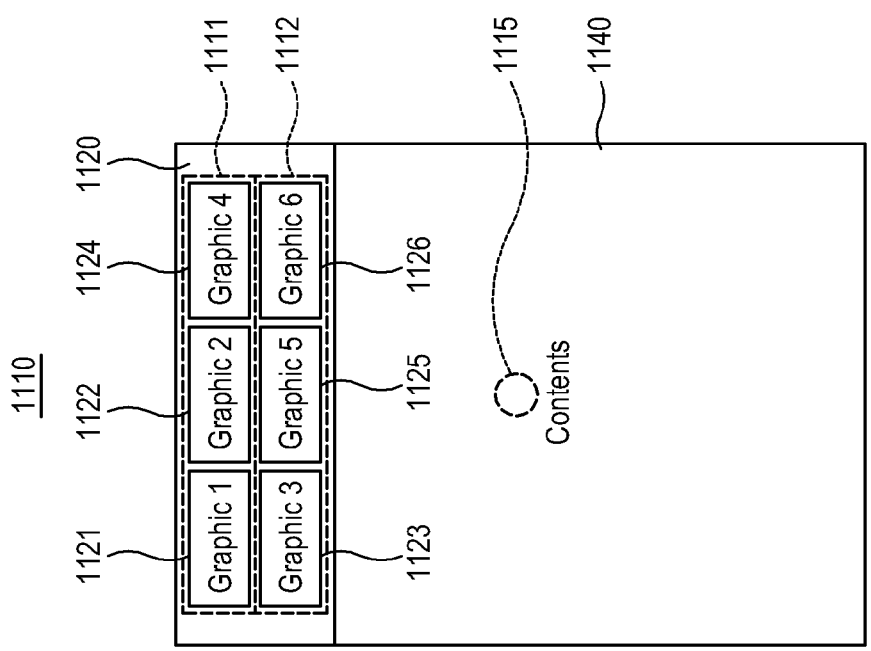

FIGS. 11A and 11B illustrate a processing of providing a first group of graphics among the plurality of graphics according to an exemplary embodiment.

In a screen 1110 of FIG. 11A, the apparatus 100 can sense a user's gesture 1115 for selecting a part of a second area 1140 in the state that a plurality of graphics 1121, 1122, 1123, 1124, 1125, and 1126 is provided in an extended first area 1120. At this time, the plurality of graphics may be divided into a first group of graphics 1111 and a second group of graphics 1112 in accordance with positions within the extended first area 1120. Here, the first group of graphics 1111 may be positioned in a higher rank than the second group of graphics 1112. Meanwhile, for example, the user's gesture for selecting a part of the second area 1140 may include a tap, a contact, or etc. for selecting the second area 1120.

In the screen 1150 of FIG. 11B, the apparatus 100 downsizes an extended first area 1120 to an original area 1160 in response to the user's gesture 1115, and displays the first group of graphics 1111 in the downsized first area 1160. At this time, the second group of graphics 1112 is hidden, and an identifier 1127 for representing that the second group of graphics 1112 can be provided may be placed at one side of the downsized first area 1160. Meanwhile, the first group of graphics 1111 may include a second graphic 1124 moved to an area for the first graphic in accordance with a user's gesture in FIG. 9A, and the second group of graphics 1112 may include a first group of graphics 1123 moved to an area for the second graphic.

In the screens 1110 and 1150 of FIGS. 11A and 11B, when the first area 1120 of the apparatus 100 is downsized to the original area 1160, a visible feedback may be given to at least one 1121 among the plurality of graphics 1121 to 1124 and contents corresponding to one graphic 1121 may be activated. For example, if the visible feedback of the graphic 1121 is removed when the first area is enlarged to the extended first area 1120, the visible feedback may be given again to the graphic 1121, the feedback of which is removed, as the first area is downsized to the original area 1160. Also, if a set of contents in the second area related to the graphic 1121 is inactivated as the first area is enlarged to the extended first area 1120, the set of contents related to the graphic 1121 may be activated again to receive a user's input as the first area is downsized to the original area 1160.

Figure 12:
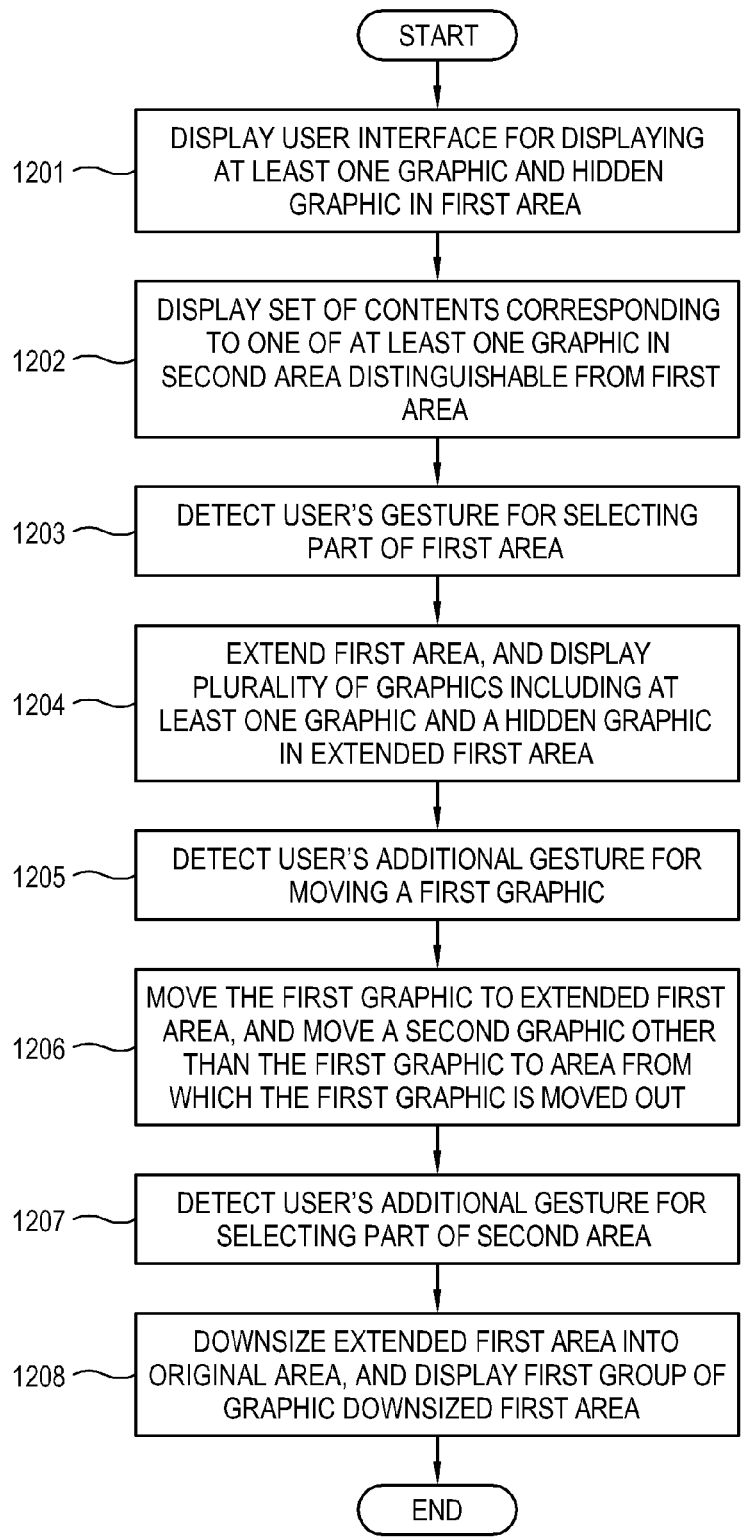
FIG. 12 is a flowchart showing a method of providing a user interface of the apparatus according to an exemplary embodiment.

FIG. 12 is a flowchart showing a method of providing a user interface of the apparatus 100 according to an exemplary embodiment.

At operation 1201, the apparatus 100 may display a user interface for displaying at least one graphic and a hidden graphic in the first area. At operation 1202, the apparatus 100 may display a set of contents corresponding to one of the at least one graphic in the second area distinguishable from the first area. Also, the apparatus 100 may display an identifier for showing a direction, where the hidden graphic is disposed, at one side of the first area.

In the case that the apparatus 100 detects a user's gesture for selecting the user interface, the apparatus 100 may detect a user's contact position and a contact released position on the user interface. Further, the apparatus 100 may determines a direction of the gesture on the basis of the contact position and the contact released position, and thus display the hidden graphic corresponding to the direction of the gesture.

At operation 1203, the apparatus 100 may detect a user's gesture for selecting a part of the first area. At operation 1204, the apparatus 100 enlarges the first area up to a part of the second area in response to a user's gesture, and display at least one graphic and a plurality of graphics including a hidden graphic in the enlarged first area. At this time, the apparatus 100 may display at least a part of the graphic hidden in an area converted from the second area to the first area. Also, the apparatus 100 may remove the visible feedback given to one graphic of the at least one graphic. Also, the apparatus 100 may inactivate at least one set of contents displayed in the second area.

At operation 1205, the apparatus 100 may detect a user's additional gesture for moving at least one among the plurality of graphics. At operation 1206, the apparatus 100 may move at least one among the plurality of graphics to a part of the enlarged first area in response to the user's additional gesture, and move at least one among the graphics other than the at least one moved graphic to an area from which the at least one graphic is moved out. For example, the apparatus 100 may move a first graphic among the plurality of graphics to an area for a second graphic among the plurality of graphics. Further, if the first graphic is not moved any more for a predetermined period of time, the apparatus 100 moves the second graphic to an area from which the first graphic is moved out.

The apparatus 100 divides the plurality of graphics into a first group of graphics and a second group of graphics in accordance with respective positions of the plurality of graphics. If the apparatus 100 detects a user's gesture for selecting a part of the second area at operation 1207, the apparatus 100 may downsize the enlarged first area into an original area and display the first group of graphics on the downsized first area at operation 1208.

As described above, disclosed are a method and an apparatus, in which functions corresponding to respective areas where a user's gesture is received are performed when the user's gesture is received in different areas through a user interface on a screen, so that a user's input can be more effectively acquired.

The foregoing exemplary embodiments may be realized as a program command to be executed through various computer means and recorded in a medium read by a computer. The medium read by the computer may solely or collectively include a program command, a data file, and a data configuration. The program command which is recorded in the medium is specifically designed and configured for an exemplary embodiment, but may be known and accessible by a person skilled in computer software.

The foregoing exemplary embodiments and advantages are merely exemplary and are not to be construed as limiting. The present teaching can be readily applied to other types of apparatuses. Also, the description of exemplary embodiments is intended to be illustrative, and not to limit the scope of the claims, and many alternatives, modifications, and variations will be apparent to those skilled in the art.

What is claimed is:

1. A method for providing a user interface of a mobile device, the method comprising:
    displaying at least two graphic items in an original first area of a touch screen, at least one graphic item among the at least two graphic items being selectable to allow the mobile device to perform an operation;
    displaying information in a second area of the touch screen distinguishable from the original first area;
    detecting a first gesture on a portion of the original first area;
    in response to the first gesture, forming an extended first area by extending the original first area to include a portion of the second area while displaying the at least two graphic items in the original first area, the extended first area including the original first area and an additional first area corresponding to the portion of the second area;
    in response to the first gesture, displaying a plurality of graphic items including the at least two graphic items and at least two hidden graphic items in the extended first area, the displayed at least two hidden graphic items being separately selectable and being different from each other;
    detecting a second gesture for moving a first graphic item among the plurality of graphic items; and
    in response to the second gesture, moving the first graphic item to a part of the original first area of the extended first area and moving a second graphic item of the plurality of graphic items to a part of the additional first area of the extended first area,
    wherein the first graphic item is an item among the at least two hidden graphic items displayed in the additional first area of the extended first area, and the second graphic item is an item among the at least two graphic items displayed in the original first area of the extended first area, and
    wherein the second gesture comprises a selection of the first graphic item which is being displayed in the additional first area of the extended first area and a designation of the part of the original first area of the extended first area to which the selected first graphic item is moved.

2. The method according to claim 1, wherein the displaying the plurality of graphic items comprises:
    displaying the at least two hidden graphic items in an area converted from the second area to the extended first area.

3. The method according to claim 1, wherein the displaying the at least two graphic items in the original first area comprises:
    detecting a user gesture on the original first area; and displaying a hidden graphic item in response to the user gesture.

4. The method according to claim 3, wherein the hidden graphic item is positioned in a front direction or a back direction of the at least two graphic items, and the displaying the at least two graphic items in the original first area comprises:
receiving a contact position and a contact release position of a user on the original first area;
determining a direction of a user gesture based on the contact position and the contact release position; and
displaying the hidden graphic item corresponding to the direction of the user gesture among a plurality of graphic items positioned in the front or back direction.

5. The method according to claim 3, wherein the displaying the at least two graphic items in the original first area comprises:
displaying an identifier, which shows a direction where the hidden graphic item is positioned, at one side of the first area corresponding to the front or back direction.

6. The method according to claim 1, wherein the displaying the at least two graphic items in the original first area comprises providing a visible feedback to one of the at least two graphic items, and
the displaying the information comprises displaying an information corresponding to the one of the at least two graphic items, to which the visible feedback is provided, in the second area.

7. The method according to claim 6, wherein the displaying the plurality of graphic items comprises:
removing the visible feedback.

8. The method according to claim 1, wherein the displaying the plurality of graphic items comprises:
inactivating the information displayed in the second area.

9. The method according to claim 1, wherein the plurality of graphic items are divided into a first group of graphic items and a second group of graphic items in accordance with respective positions of the plurality of graphic items, and
the displaying the plurality of graphic items comprises:
detecting a user gesture for selecting a part of the second area;
downsizing the extended first area into an original area in response to the user gesture; and
displaying the first group of graphic items in the downsized first area.

10. The method according to claim 1, wherein the second graphic item is moved to the part of the additional first area from which the first graphic item is moved out if the first graphic item is not moved any more for a predetermined period of time after the first graphic item is moved to the part of the original first area.

11. The method according to claim 1, wherein each of the at least two graphic items comprises a tab menu.

12. A mobile device providing a user interface, the mobile device comprising:
a touch screen;
a processor; and
a memory,
wherein the processor is configured to:
display at least two graphic items in an original first area of the touch screen, at least one graphic item among the at least two graphic items being selectable to allow the mobile device to perform an operation, and display information in a second area of the touch screen, the second area being distinguishable from the original first area;
wherein the processor is further configured to:
detect a first gesture on a portion of the original first area;
in response to the first gesture, from an extended first area by extending the original first area to include a portion of the second area while displaying the at least two graphic items in the original first area, the extended first area including the original first area and an additional first area corresponding to the portion of the second area;
in response to the first gesture, display a plurality of graphic items including the at least two graphic items and at least two hidden graphic items in the extended first area, the displayed at least two hidden graphic items being separately selectable and being different from each other;
detect a second gesture for moving a first graphic item among the plurality of graphic items; and
in response to the second gesture, move the first graphic item to a part of the original first area of the extended first area and move a second graphic item of the plurality of graphic items to a part of the additional first area of the extended first area,
wherein the first graphic item is an item among the at least two hidden graphic items displayed in the additional first area of the extended first area, and the second graphic item is an item among the at least two graphic items displayed in the original first area of the extended first area, and
wherein the second gesture comprises a selection of the first graphic item which is being displayed in the additional first area of the extended first area and a designation of the part of the original first area of the extended first area to which the selected first graphic item is moved.

13. The mobile device according to claim 12, wherein in the case of displaying the plurality of graphic items, the processor is configured to display the at least two hidden graphic items in an area converted from the second area to the extended first area.

14. The mobile device according to claim 12,
wherein the processor is configured to:
detect a user gesture on the original first area; and
display a hidden graphic item in the original first area in response to the user gesture.

15. The mobile device according to claim 12,
wherein in the case of displaying the plurality of graphic items,
the processor is configured to remove a visible feedback provided to one of the at least two graphic items.

16. The mobile device according to claim 12,
wherein in the case of displaying the plurality of graphic items,
the processor is configured to inactivate the information displayed in the second area.

17. The mobile device according to claim 12, wherein the plurality of graphic items are divided into a first group of graphic items and a second group of graphic items in accordance with respective positions of the plurality of graphic items, and
in the case of displaying the plurality of graphic items, the processor is configured to:
detect a user gesture for selecting a part of the second area;

downsize the extended first area into an original area in response to the user gesture; and
display the first group of graphic items in the downsized first area.

18. The mobile device according to claim 12, wherein the processor is configured to:
move the second graphic item to the part of the additional first area from which the first graphic item is moved out if the first graphic item is not moved any more for a predetermined period of time after the first graphic item is moved to the part of the original first area.

19. The mobile device according to claim 12, wherein each of the at least two graphic items comprises a tab menu.

20. A non-transitory computer-readable medium having a program recorded thereon, which program when executed by a computer, causes the computer to execute a method for providing a user interface in a mobile device, the method comprising:
displaying at least two graphic items in an original first area of a touch screen, at least one graphic item among the at least two graphic items being selectable to allow the mobile device to perform an operation;
displaying information in a second area of the touch screen distinguishable from the original first area;
detecting a first gesture on a portion of the original first area;
in response to the first gesture, forming an extended first area by extending the original first area to include a portion of the second area while displaying the at least two graphic items in the original first area, the extended first area including the original first area and an additional first area corresponding to the portion of the second area;
in response to the first gesture, displaying a plurality of graphic items including the at least two graphic items and at least two hidden graphic items in the extended first area, the displayed at least two hidden graphic items being separately selectable and being different from each other;
detecting a second gesture for moving a first graphic item among the plurality of graphic items; and
in response to the second gesture, moving the first graphic item to a part of the original first area of the extended first area and moving a second graphic item of the plurality of graphic items to a part of the additional first area of the extended first area,
wherein the first graphic item is an item among the at least two hidden graphic items displayed in the additional first area of the extended first area, and the second graphic item is an item among the at least two graphic items displayed in the original first area of the extended first area, and
wherein the second gesture comprises a selection of the first graphic item which is being displayed in the additional first area of the extended first area and a designation of the part of the original first area of the extended first area to which the selected first graphic item is moved.

21. The method according to claim 1, wherein the first gesture includes contacting on the portion of the original first area.

22. The method according to claim 1, wherein the second gesture includes contacting on the first graphic item, moving the first graphic item to the part of the original first area and releasing the contacting on the first graphic item at the part of the original first area.

23. The method according to claim 1, further comprising moving a third graphic item positioned at the part of the original first area to another part of the original first area in response to the second gesture.

24. The method according to claim 23, wherein the part of the original first area is adjacent to the other part of the original first area.

25. The mobile device according to claim 12,
wherein the first gesture includes contacting on the portion of the original first area.

26. The mobile device according to claim 12,
wherein the second gesture includes contacting on the first graphic item, moving the first graphic item to the part of the original first area and releasing the contacting on the first graphic item at the part of the original first area.

27. The mobile device according to claim 12,
wherein the processor is configured to move a third graphic item positioned at the part of the original first area to another part of the original first area in response to the second gesture.

28. The mobile device according to claim 27,
wherein the part of the original first area is adjacent to the other part of the original first area.

29. The non-transitory computer readable medium according to claim 20, wherein the first gesture includes contacting on the portion of the original first area.

30. The non-transitory computer readable medium according to claim 20, wherein the second gesture includes contacting on the first graphic item, moving the first graphic item to the part of the original first area and releasing the contacting on the first graphic item at the part of the original first area.

31. The non-transitory computer readable medium according to claim 20, wherein the method further comprises moving a third graphic item positioned at the part of the original first area to another part of the original first area in response to the second gesture.

32. The non-transitory computer readable medium according to claim 31, wherein the part of the original first area is adjacent to the other part of the original first area.

33. The method according to claim 1, further comprising detecting a user selection of one of the at least two graphic items displayed in the original first area, and displaying a set of information corresponding to the selected graphic item in response to the user selection.

34. The mobile device according to claim 12,
wherein the processor is configured to detect a user selection of one of the at least two graphic items displayed in the original first area, and display a set of information corresponding to the selected graphic item in response to the user selection.

35. The non-transitory computer readable medium according to claim 20, wherein the method further comprises detecting a user selection of one of the at least two graphic items displayed in the original first area, and displaying a set of information corresponding to the selected graphic item in response to the user selection.

36. The method according to claim 1, wherein the second gesture comprises a drag of the first graphic item which is being displayed in the additional first area and a drop of the selected first graphic item into the part of the original first area.

37. The method according to claim 1, wherein the displaying the at least two graphic items in the original first area further comprises displaying an indicator, which shows a presence of the at least two hidden graphic items, together with the at least two graphic items in the original first area of the touch screen.

38. The method according to claim 37, wherein the first gesture comprises a gesture which selects the indicator displayed in the touch screen.

39. The mobile device according to claim 12, wherein the second gesture comprises a drag of the first graphic item which is being displayed in the additional first area and a drop of the selected first graphic item into the part of the original first area.

40. The mobile device according to claim 12, wherein the processor is configured to display an indicator, which shows a presence of the at least two hidden graphic items, together with the at least two graphic items in the original first area of the touch screen.

41. The mobile device according to claim 40, wherein the first gesture comprises a gesture which selects the indicator displayed in the touch screen.

42. The non-transitory computer-readable medium according to claim 20, wherein the second gesture comprises a drag of the first graphic item which is being displayed in the additional first area and a drop of the selected first graphic item into the part of the original first area.

43. The non-transitory computer-readable medium according to claim 20, wherein the displaying the at least two graphic items in the original first area further comprises displaying an indicator, which shows a presence of the at least two hidden graphic items, together with the at least two graphic items in the original first area of the touch screen.

44. The non-transitory computer-readable medium according to claim 43, wherein the first gesture comprises a gesture which selects the indicator displayed in the touch screen.

45. The method according to claim 1, wherein the displaying the at least two graphic items in the original first area of the touch screen comprises displaying the at least two graphic items in the original first area in a horizontal direction of the touch screen, and
wherein the forming the extended first area comprises forming the extended first area by extending, in a vertical direction of the touch screen, the original first area to include the portion of the second area.

46. The method according to claim 1, wherein the information displayed in the second area is moved downwardly according to the extending of the original first area.

47. The method according to claim 1, wherein a detailed menu relating to one graphic item among the plurality of graphic items is displayed in the touch screen in response to touching the one graphic item and holding on the touched one graphic item for a predetermined time.

48. The method according to claim 1, wherein the device includes a touch screen including a status area that provides information relating to a status of the device and a main area that includes the original first area and the second area.

49. The method according to claim 48, wherein the status area includes time information and is provided in an upper part of the touch screen.

50. The mobile device according to claim 12, wherein the processor is configured to display the at least two graphic items in the original first area in a horizontal direction of the touch screen, and
wherein the processor is configured to form the extended first area by extending, in a vertical direction of the touch screen, the original first area to include the portion of the second area.

51. The mobile device according to claim 12, wherein the information displayed in the second area is moved downwardly according to the extending of the original first area.

52. The mobile device according to claim 12, wherein a detailed menu relating to one graphic item among the plurality of graphic items is displayed in the touch screen in response to touching the one graphic item and holding on the touched one graphic item for a predetermined time.

53. The mobile device according to claim 12, wherein the touch screen includes a status area that provides information relating to a status of the device and a main area that includes the original first area and the second area.

54. The mobile device according to claim 53, wherein the status area includes time information and is provided in an upper part of the touch screen.

55. The non-transitory computer readable medium according to claim 20, wherein the displaying the at least two graphic items in the original first area of the touch screen comprises displaying the at least two graphic items in the original first area in a horizontal direction of the touch screen, and
wherein the forming the extended first area comprises forming the extended first area by extending, in a vertical direction of the touch screen, the original first area to include the portion of the second area.

56. The non-transitory computer readable medium according to claim 20, wherein the information displayed in the second area is moved downwardly according to the extending of the original first area.

57. The non-transitory computer readable medium according to claim 20, wherein a detailed menu relating to one graphic item among the plurality of graphic items is displayed in the touch screen in response to touching the one graphic item and holding on the touched one graphic item for a predetermined time.

58. The non-transitory computer readable medium according to claim 20, wherein the device includes a touch screen including a status area that provides information relating to a status of the device and a main area that includes the original first area and the second area.

59. The non-transitory computer readable medium according to claim 58, wherein the status area includes time information and is provided in an upper part of the touch screen.

* * * * *